(12) United States Patent
Nishima et al.

(10) Patent No.: US 9,028,076 B2
(45) Date of Patent: May 12, 2015

(54) PROJECTOR

(75) Inventors: Ryo Nishima, Yokohama (JP); Norihisa Yamamoto, Tama (JP); Kouichi Kawamura, Yokohama (JP)

(73) Assignee: JVC Kenwood Corporation, Yokohama-shi, Kanagawa (JP)

(*) Notice: Subject to any disclaimer, the term of this patent is extended or adjusted under 35 U.S.C. 154(b) by 232 days.

(21) Appl. No.: 13/538,063

(22) Filed: Jun. 29, 2012

(65) Prior Publication Data

US 2013/0010268 A1  Jan. 10, 2013

(30) Foreign Application Priority Data

Jul. 4, 2011 (JP) .................................. 2011-148624
Apr. 4, 2012 (JP) .................................. 2012-085524

(51) Int. Cl.
*G03B 21/16* (2006.01)
*G03B 21/14* (2006.01)
*H04N 9/31* (2006.01)

(52) U.S. Cl.
CPC .............. *H04N 9/3144* (2013.01); *G03B 21/16* (2013.01); *G03B 21/145* (2013.01)

(58) Field of Classification Search
CPC ........ G03B 21/14; G03B 21/16; G03B 21/30; G03B 11/043; G03B 11/06; G03B 21/145; G02B 5/005; G02B 23/16; H04N 9/3144; H04N 9/3173
USPC ......... 353/119, 52, 57, 58, 60, 61, 88, 97, 75; 359/738, 511
See application file for complete search history.

(56) References Cited

U.S. PATENT DOCUMENTS

2003/0202160 A1  10/2003  Chimura et al.
2004/0246447 A1  12/2004  Shiraishi
2005/0062938 A1   3/2005  Murai et al.

(Continued)

FOREIGN PATENT DOCUMENTS

CN    1573520 A   2/2005
CN    1598687 A   3/2005

(Continued)

OTHER PUBLICATIONS

Fukutomi et al.; JP 2011-107282; Jun. 2, 2011; Machine translation in English.*

(Continued)

*Primary Examiner* — William C. Dowling
*Assistant Examiner* — Ryan Howard
(74) *Attorney, Agent, or Firm* — Nath, Goldberg & Meyer; Jerald L. Meyer

(57) ABSTRACT

In a projector, a projection unit includes a projection mechanism that projects an image and an air hole that takes in or exhausts air used to dissipate heat generated from a light source included in the projection mechanism. A housing covers the air hole when the projection unit is in a storage position in which the projection unit does not project an image and uncovers the air hole when the projection unit is in a projection position in which the projection unit projects an image. The drive mechanism moves the projection unit or a cover member. An electronic control unit controls the drive mechanism to move the projection unit to the projection position in which an image is projected when receiving a predetermined projection preparation request and move the projection unit to the storage position in which no image is projected when receiving a predetermined storage request.

4 Claims, 19 Drawing Sheets

(56) References Cited

U.S. PATENT DOCUMENTS

2005/0169121 A1* 8/2005 Keller et al. ............... 369/30.27
2006/0012756 A1* 1/2006 Rogers et al. .................. 353/58

FOREIGN PATENT DOCUMENTS

| DE | 1791809 U | 7/1959 |
| JP | 2005092098 A | 4/2005 |
| JP | 2007010709 A | 1/2007 |
| JP | 2007093992 A | 4/2007 |
| JP | 2011-107282 A | 6/2011 |
| KR | 20080044952 A | 5/2008 |

OTHER PUBLICATIONS

Official Action issued on Jun. 17, 2013 in the counterpart Korean application.
European Search Report, Application No. EP 12 00 4931, issued on Oct. 22, 2012, seven (7) pages.
Official Action issued on Jun. 19, 2014 in the counterpart Chinese application, eight (8) pages.
Official Action issued on Jul. 4, 2014 in the counterpart Taiwanese application No. 101123893, 15 pages.

* cited by examiner

P–P

PROJECTOR

CROSS REFERENCE TO RELATED APPLICATION

This application claims benefit of priority under 35 U.S.C. §119 to Japanese Patent Application Nos. 2011-148624 filed on Jul. 4, 2011 and 2012-085524 filed on Apr. 4, 2012, the entire contents of which are incorporated by reference herein.

BACKGROUND OF THE INVENTION

1. Field of the Invention

The present invention relates to a projector.

2. Description of the Related Art

A projector which projects an image is desired to change a projection direction to various angles with respect to the horizontal direction in order to project an image to a desired projection surface. Here, a technique is proposed in which when a non-projection state is selected, a housing including a projection mechanism is rotated so that an opening for projecting an image is covered by a support member (for example, see Patent Document 1 (Japanese Unexamined Patent Application Publication No. 2011-107282)).

In recent years, not only business use of a projector, but also home use of a projector, such as projecting a movie, is rapidly spreading, so that a request for high quality projection image is gradually increasing. On the other hand, a light source of the projector generates a large amount of heat, so that intake of air from outside through an air hole may be required to dissipate the heat. However, the air from the outside may include dust, and if the dust attaches to a lens or a mirror in a projection mechanism, the dust may affect quality of projected image.

SUMMARY OF THE INVENTION

The present invention is made to solve the above problem and an object of the present invention is to prevent dust from entering the inside of the projector through the air hole.

To solve the above problem, according to an aspect of the present invention, there is provided a projector including a projection unit including a projection mechanism that projects an image and an air hole that takes in or exhausts air used to dissipate heat of the projection mechanism, a drive mechanism that moves the projection unit, a control unit that controls the drive mechanism to move the projection unit to a projection position in which an image can be projected when the control unit receives a predetermined projection preparation request and move the projection unit to a projection prevention position in which image is prevented from being projected when the control unit receives a predetermined projection prevention request, and a cover member that is provided to cover the air hole when the projection unit is in the projection prevention position and uncover the air hole when the projection unit is in the projection position.

According to the present invention, it is possible to prevent dust from entering the inside of the projector through the air hole.

DESCRIPTION OF THE EMBODIMENTS (First Embodiment)

Figure 1A:
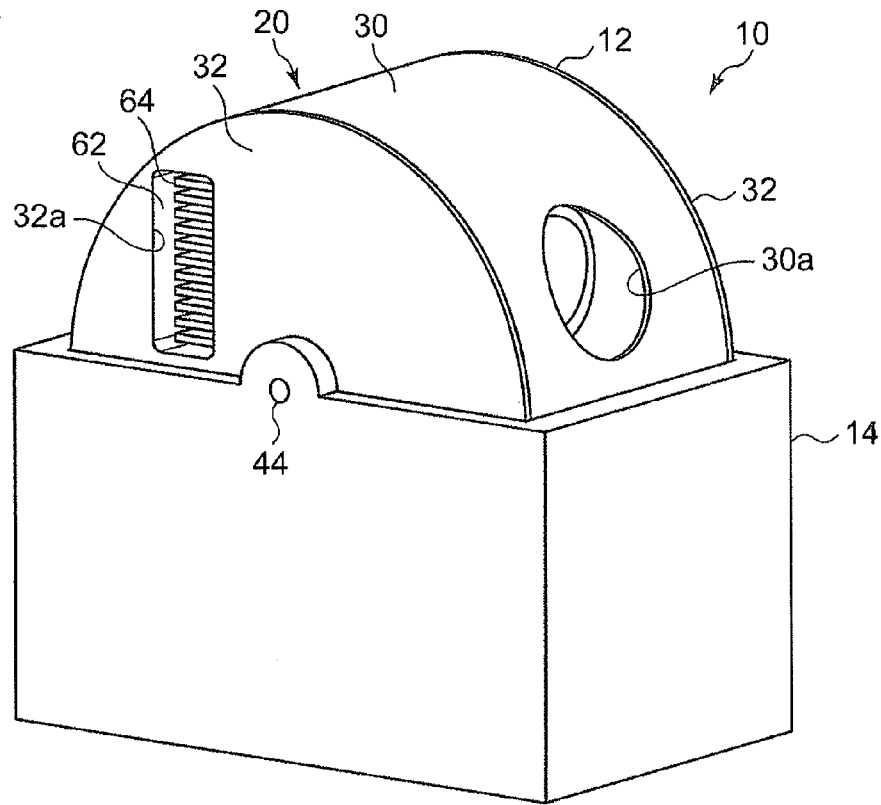
FIG. 1A is a perspective view of a projector according to a first embodiment.
Figure 1B:
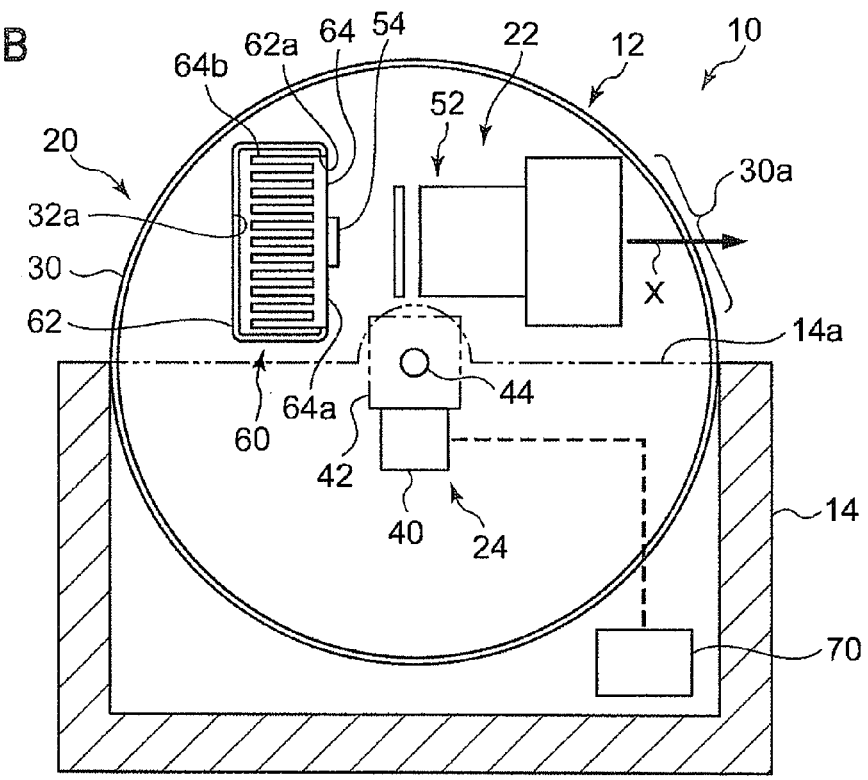
FIG. 1B is a side transparent view of the projector according to the first embodiment.

FIG. 1A is a perspective view of a projector 10 according to a first embodiment. FIG. 1B is a side transparent view of the projector 10 according to the first embodiment. The projector 10 includes a projection unit 12 and a housing 14. The projection unit 12 is formed into a cylindrical shape and supported by the housing 14 so that the central axis of the projection unit 12 is directed in the horizontal direction. At this time, the housing 14 rotatably supports the projection unit 12. Therefore, the housing 14 functions as a support member that supports the projection unit 12.

The projection unit 12 includes a chassis 20, a projection mechanism 22, and a drive mechanism 24. The chassis 20 includes a cylindrical portion 30 and two sidewalls 32. The sidewalls 32 are provided to respectively cover openings of both ends of the cylindrical portion 30. FIG. 1B shows a state in which the sidewalls 32 are removed from the cylindrical portion 30 so that the inside of the projection unit 12 can be seen. A tubular portion having another shape may be provided instead of the cylindrical portion 30. For example, a tubular portion having a cross-sectional shape of a regular polygon such as a regular hexagon or a regular octagon may be provided.

The chassis 20 houses the projection mechanism 22. The projection mechanism 22 is fixed to the inside of the chassis 20. An opening 30a is provided in the cylindrical portion 30 and the projection mechanism 22 projects an image to the outside through the opening 30a.

The opening 30a is covered by a transparent cover (not shown in the drawings) that prevents foreign substances from entering the inside of the chassis 20. If the transparent cover protrudes from a circle formed by the chassis 20, the rotation of the chassis 20 is prevented. Therefore, the transparent cover is disposed more inside of the cylindrical portion 30 than the opening 30a so that the transparent cover does not protrude from the chassis 20. The transparent cover may include a lens function such as a wide conversion lens.

The drive mechanism 24 includes a motor 40, a power transmission mechanism 42, and a shaft 44. An insertion hole is provided at the center of each of the two sidewalls 32 and the shaft 44 is rotatably inserted into the insertion holes. In this way, the housing 14 rotatably supports the projection unit 12 and the central axis of the cylindrical portion 30 is the rotation axis of the projection unit 12. Both ends of the shaft 44 are fixed to the housing 14. The motor 40 is fixed to the chassis 20 through a motor base (not shown in the drawings) formed into a plate shape. The motor 40 provides a rotation drive force to the shaft 44 through the power transmission mechanism 42 including a gear. The shaft 44 is fixed to the housing 14 and cannot be rotated, so that when the motor 40 is activated, the chassis 20 rotates around the shaft 44. In this way, the motor 40 functions as an actuator that rotates the chassis 20 with respect to the housing 14.

The chassis 20 houses not only the projection mechanism 22, but also the drive mechanism 24. The chassis 20 thus houses the drive mechanism 24, so that the configuration outside the projection unit 12 can be simplified and the projector 10 having a good design can be provided.

The projection mechanism 22 includes an optical unit 52 and a light source 54. The optical unit 52 includes a plurality of lenses. The light source 54 includes an LED (Light Emitting Diode) which is a semiconductor light emitting device. As the light source 54, an electric discharge lamp such as a mercury discharge lamp or an incandescent lamp using a filament may be employed.

The light source 54 generates heat when lighting, so that it is necessary to dissipate heat to prevent the life of the light source 54 from being shortened. Therefore, the chassis 20 is further provided with a heat dissipation mechanism 60. The heat dissipation mechanism 60 includes a duct 62 and a heat sink 64. The duct 62 has a tubular shape whose cross section is rectangle. Each of the two sidewalls 32 is provided with an air hole 32a having substantially the same shape as that of the cross section of the duct 62. The air hole 32a takes in or exhausts air used to dissipate heat of the light source 54 of the projection mechanism 22. The duct 62 is disposed inside the chassis 20 so that duct openings at both ends of the duct 62 overlap the air holes 32a. The duct 62 is provided with a fan (not shown in the drawings). When the light source 54 is turned on, the fan is activated to take air in from one air hole 32a and exhausts the air from the other air hole 32a through the inside of the duct 62. Therefore, the inside of the duct 62 is an air passing area. One of the two air holes 32a is an intake hole and the other is an exhaust hole.

The heat sink 64 is formed so that many heat dissipation fins 64b protrude from one surface of a plate portion 64a. The heat sink 64 is formed of a heat dissipation material having a high thermal conductivity, such as aluminum, and the heat sink 64 functions as a heat dissipation member.

The heat sink 64 is used to dissipate the heat of the light source 54. Specifically, the light source 54 is attached to a surface of the plate portion 64a opposite to the surface on which the heat dissipation fins 64b are provided. In this way, the heat generated from the light source 54 is collected by the plate portion 64a of the heat sink 64 and the collected heat is dissipated from the heat dissipation fins 64b.

The duct 62 is provided with a mounting hole 62a for inserting the heat sink 64. The heat sink 64 is inserted into the mounting hole 62a in order from the heat dissipation fins 64b. The shape of the mounting hole 62a is substantially the same as the outer shape of the plate portion 64a. The plate portion 64a is fitted into the mounting hole 62a and the heat sink 64 is fixed to the duct 62.

In this way, the heat sink 64 is provided so as to be in contact with both the light source 54 and the air taken in and exhausted from the air holes 32a. The plate portion 64a of the heat sink 64 separates the inside area of the chassis 20 in which the projection mechanism 22 is provided from the air passing area through which the air passes, in order to prevent the air from entering the inside area. In this way, the air passing area is separated from the inside area of the chassis 20, so that it is possible to prevent dust from entering the inside area of the chassis 20 from the air holes 32a. Therefore, it is possible to prevent the dust from affecting the optical unit 52 and the like.

The duct 62, the heat sink 64, and the air holes 32a are formed so that no gap is generated between the duct 62 and the heat sink 64 and between the duct 62 and the air holes 32a. In order to prevent a gap from being generated, a seal member such as a polyurethane sponge or rubber maybe disposed between them.

The projector 10 is provided with an electronic control unit 70. Although the electronic control unit 70 is disposed inside the housing 14 in the first embodiment, the electronic control unit 70 may be disposed inside the projection unit 12. The electronic control unit 70 includes a CPU that performs various calculations, a ROM that stores various control programs, and a RAM used as a work area for storing data and executing a program. The electronic control unit 70 functions as a drive control unit and controls the drive mechanism 24 to rotate the chassis 20. The electronic control unit 70 also functions as an image control unit, and generates image data of an image to be projected to the outside.

The projection mechanism 22 includes a spatial modulation element (not shown in the drawings). For example, the electronic control unit 70 performs image processing on image data read from a DVD (Digital Versatile Disc) to project the image data to the spatial modulation element and generates image data. The spatial modulation element displays an image represented by the generated image data. Projection light of the image displayed in this way is projected from the projection mechanism 22 to the outside through the opening 30a. The image projected from the opening 30a is formed on a screen (not shown in the drawings) provided outside the projector 10. The electronic control unit 70 controls on and off of the light source 54 and the brightness of the light emitted from the light source 54.

FIGS. 1A and 1B show the projector 10 when the projection unit 12 is in a horizontal projection position. The horizontal projection position of the projection unit 12 is a projection position where the projection mechanism 22 can project an image in the horizontal direction. When the projection unit 12 is set to the horizontal projection position, the projection unit 12 is positioned so that an optical axis X is directed to the horizontal forward direction.

When the projection unit 12 is in the horizontal projection position, the opening 30a is located above the upper end 14a of the housing 14. Therefore, the housing 14 is provided so as to uncover the opening 30a when the projection unit 12 is in the horizontal projection position. At this time, the air holes 32a are also located above the upper end 14a of the housing 14. Therefore, the housing 14 is provided so as to also uncover the air holes 32a when the projection unit 12 is in the horizontal projection position.

Figure 2A:
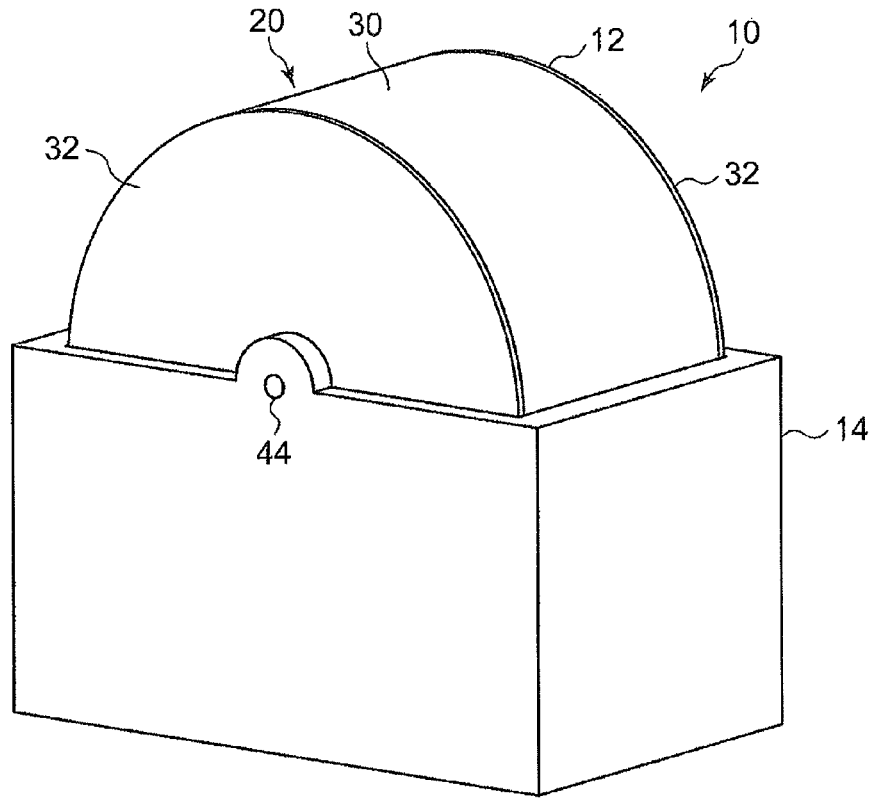
FIG. 2A is a perspective view of the projector according to the first embodiment when a projection unit is in a storage position.
Figure 2B:
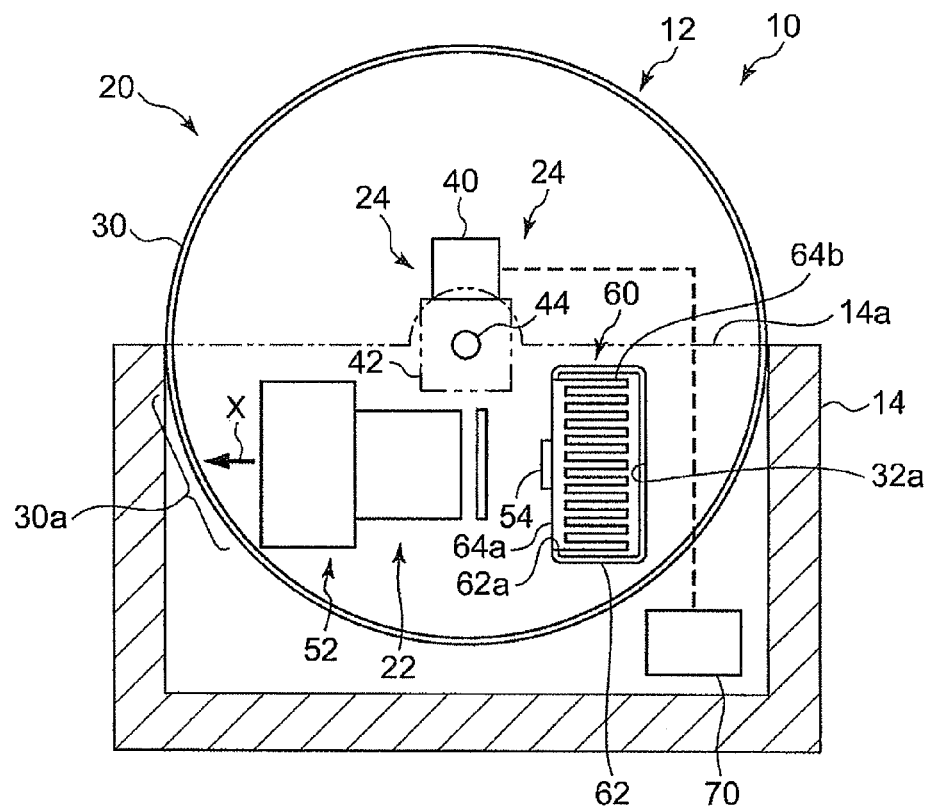
FIG. 2B is a side transparent view of the projector according to the first embodiment when the projection unit is in the storage position.

FIG. 2A is a perspective view of the projector 10 according to the first embodiment when the projection unit 12 is in a storage position. FIG. 2B is a side transparent view of the projector 10 according to the first embodiment when the projection unit 12 is in the storage position. The storage position may be called a projection prevention position where the projection mechanism 22 is prevented from projecting an image. When the projection unit 12 is in the storage position, the projection unit 12 is positioned so that the optical axis X is directed to the horizontal backward direction.

When the projection unit 12 is in the storage position, the opening 30a is located below the upper end 14a of the housing 14. Therefore, the housing 14 is provided so as to cover the opening 30a when the projection unit 12 is in the storage position. At this time, the air holes 32a are also located below the upper end 14a of the housing 14. Therefore, the housing 14 is provided so as to cover also the air holes 32a when the projection unit 12 is in the storage position. Therefore, the housing 14 functions as a cover member.

When the projection unit 12 is in the storage position, the housing 14 may cover one of the two air holes 32a, and when the projection unit 12 is in the horizontal projection position, the housing 14 may uncover the one of the two air holes 32a. At this time, the other air hole 32a may be uncovered and communicates with the outside at all times. A member that covers the opening 30a or the air hole 32a may be provided separately from the housing 14.

The projection unit 12 is placed in the storage position and the opening 30a is covered, so that the transparent cover provided to the opening 30a is not exposed to the outside air. Thereby, when the projector 10 is not used, it is possible to prevent foreign substances from attaching to the transparent cover provided to the opening 30a. Also, an effect is expected in which dust is prevented from entering the inside area of the chassis 20 through the opening 30a. Similarly, when the air holes 32a are covered, it is possible to prevent dust from entering the inside area of the chassis 20 through the air holes 32a.

The projector 10 is provided with a control panel (not shown in the drawings) and an S/E (Start/End) button (not shown in the drawings) is provided on the control panel. When the power of the projector 10 is off, if the S/E button is pressed, the power is supplied to each unit including the electronic control unit 70, and then the electronic control unit 70 receives a projection preparation request that requests the electronic control unit 70 to generate a projection preparation state in which the projection mechanism 22 can project an image. When receiving the projection preparation request, the electronic control unit 70 controls the drive mechanism 24 to rotate the chassis 20 to the horizontal projection position.

When the power of the projector 10 is on, if the S/E button is pressed, the electronic control unit 10 receives a projection prevention request that requests the electronic control unit 70 to turn off the power of the projector 10 and generate a projection prevention state in which the projection mechanism 22 is prevented from projecting an image. When receiving the projection prevention request, the electronic control unit 70 controls the drive mechanism 24 to rotate the chassis 20 to the storage position. The S/E button may be provided on a remote control which is separated from the projector 10. The electronic control unit 70 may be provided so that the electronic control unit 70 can wirelessly receive an operation inputted to the remote control.

For example, the drive mechanism 24 may move the chassis 20 in the vertical direction. In this case, the electronic control unit 70, when receiving a predetermined projection preparation request, moves the chassis 20 up to a projection position where image can be projected. The electronic control unit 70, when receiving a predetermined projection prevention request, controls the drive mechanism 24 so as to move the chassis 20 down to a projection prevention position where an image should be prevented from being projected.

(Second Embodiment)

Figure 3A:
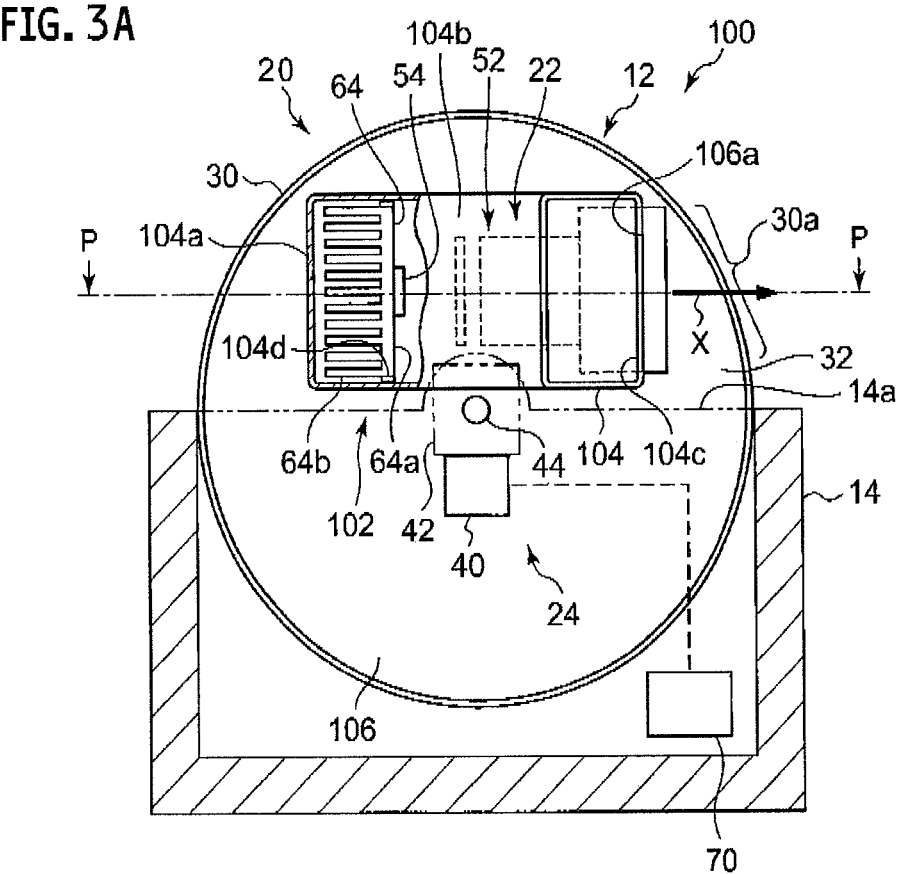
FIG. 3A is a side transparent view of a projector according to a second embodiment.
Figure 3B:
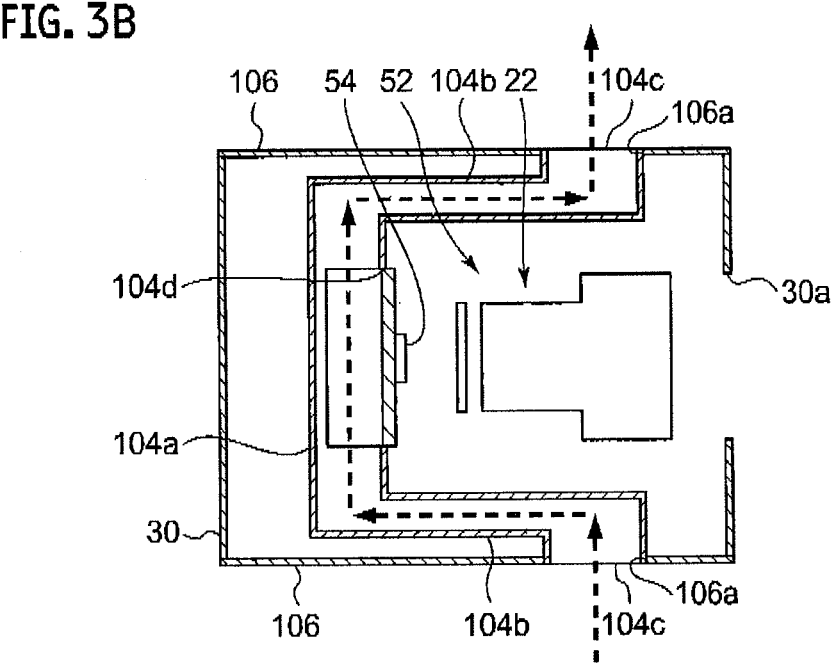
FIG. 3B is a cross-sectional view taken along line P-P in FIG. 3A.

FIG. 3A is a side transparent view of a projector 100 according to a second embodiment. FIG. 3B is a cross-sectional view taken along line P-P in FIG. 3A. Hereinafter, the same components as those in the first embodiment are given the same reference numerals and the descriptions thereof will be omitted.

The projector 100 is configured in the same manner as the projector 10 of the first embodiment except that sidewalls 106 are provided instead of the sidewalls 32 and a heat dissipation mechanism 102 is provided instead of the heat dissipation mechanism 60. The sidewall 106 is formed in the same manner as the sidewall 32 except that an air hole 106a whose position is different from that of the air hole 32a is provided instead of the air hole 32a.

The air hole 106a is disposed at a position nearer to the opening 30a than that of the air hole 32a. The heat dissipation mechanism 102 includes a heat sink 64 and a duct 104. The duct 104 includes a heat sink mounting portion 104a, connection portions 104b, and duct openings 104c. The heat sink mounting portion 104a is provided with a mounting hole 104d similar to the mounting hole 62a of the first embodiment and the heat sink 64 is mounted on the mounting hole 104d. Therefore, also in the second embodiment, the heat sink 64 is provided so as to be in contact with both the light source 54 and the air taken in and exhausted from the air holes 106a. Also, the plate portion 64a of the heat sink 64 separates the inside area of the chassis 20 from the air passing area through which the air passes, in order to prevent the air from entering the inside area. In the same manner as in the first embodiment, a fan (not shown in the drawings) is provided to the heat dissipation mechanism 102 and the fan is activated when the light source 54 is turned on.

The connection portion 104b connects an end portion of the connection portion 104b and the duct opening 104c so that the duct opening 104c is located nearer to the opening 30a than to the heat sink 64. In this way, the duct 104 is formed into a substantial C-shape to surround the projection mechanism 22. The air hole 106a is provided at a position overlapping the duct opening 104c of the duct 104. In this way, the air hole 106a is disposed at a position nearer to the opening 30a than that of the air hole 32a according to the first embodiment.

A control panel is provided with a selector switch that issues an instruction for switching between a horizontal projection position in which an image is projected in a substantially horizontal direction and a vertical projection position in which an image is projected in an upward vertical direction. A user can switch the projection direction of an image by pressing the selector switch.

FIGS. 3A and 3B show the projector 100 when the projection unit 12 is in the horizontal projection position. When the projection unit 12 is set to the horizontal projection position, the projection unit 12 is positioned so that the optical axis X is directed to the horizontal forward direction.

Also in the second embodiment, when the projection unit 12 is in the horizontal projection position, the opening 30a is located above the upper end 14a of the housing 14. Therefore, the housing 14 is provided so as to uncover the opening 30a when the projection unit 12 is in the horizontal projection position. At this time, the air holes 106a are also located above the upper end 14a of the housing 14. Therefore, the housing 14 is provided so as to also uncover the air holes 106a when the projection unit 12 is in the horizontal projection position.

When the electronic control unit 70 moves the projection unit 12 to the storage position, in the same manner as in the first embodiment, the electronic control unit 70 rotates the projection unit 12 so that the optical axis X is directed to the horizontal backward direction. Also in the second embodiment, when the projection unit 12 is in the storage position, the opening 30a is located below the upper end 14a of the housing 14. Therefore, the housing 14 is provided so as to cover the opening 30a when the projection unit 12 is in the storage position. At this time, the air holes 106a are also located below the upper end 14a of the housing 14. Therefore, the housing 14 is provided so as to cover also the air holes 106a when the projection unit 12 is in the storage position.

Figure 4:
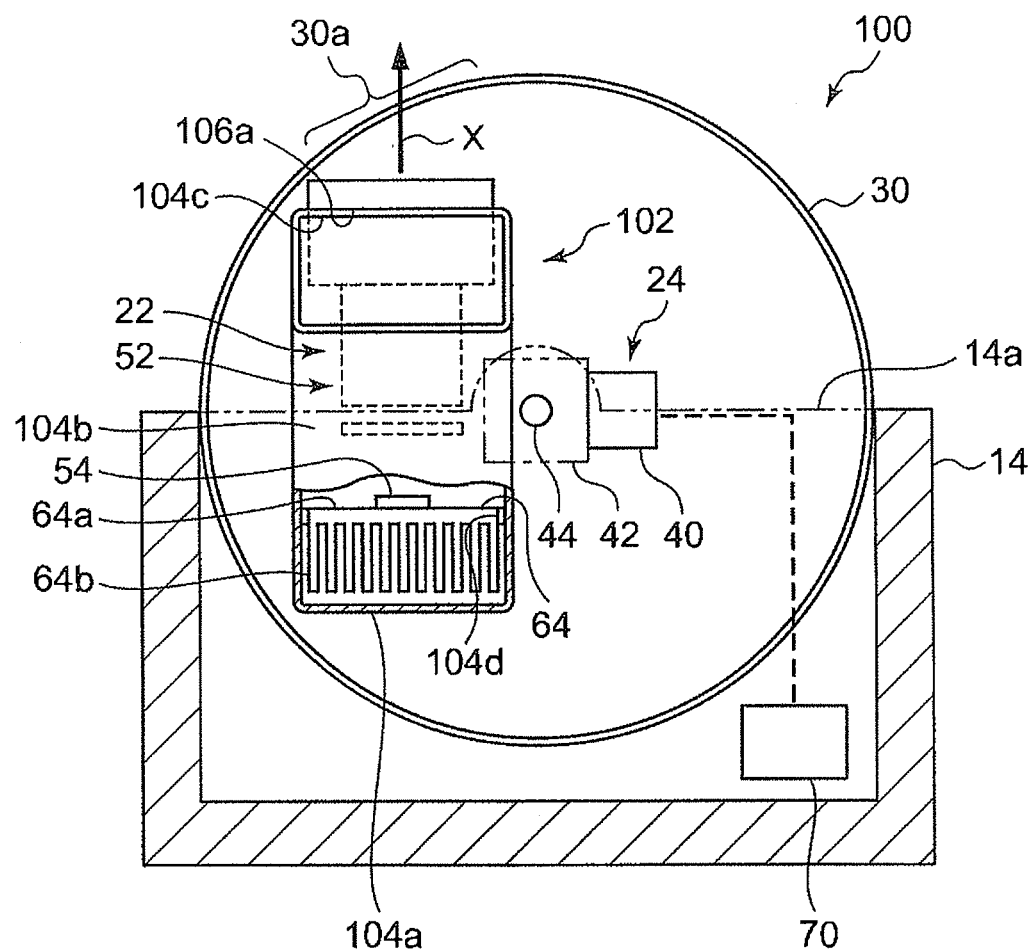
FIG. 4 is aside transparent view of the projector according to the second embodiment when the projector projects an image in the upward vertical direction.

FIG. 4 is a side transparent view of the projector 100 according to the second embodiment when the projector 100 projects an image in the upward vertical direction. If the selector switch is pressed when the projection unit 12 is in the horizontal projection position, the electronic control unit 70 controls the drive mechanism 24 to rotate the projection unit 12 to the vertical projection position.

When the projection unit 12 is in the vertical projection position, the opening 30a is located above the upper end 14a of the housing 14. Therefore, the housing 14 is provided so as to uncover the opening 30a when the projection unit 12 is in the vertical projection position. At this time, the air holes 106a are also located above the upper end 14a of the housing 14. Therefore, the housing 14 is provided so as to also uncover the air holes 106a when the projection unit 12 is in the vertical projection position.

In this way, the air holes 106a are disposed near the opening 30a, so that when the opening 30a is uncovered, the air holes 106a can be also uncovered. Therefore, the projection unit 12 can be rotated by a larger angle while air can be taken in and exhausted from the air holes 106a, so that the direction to which the optical axis X is directed can be largely changed.

The direction to which the optical axis X is directed by the selector switch is not limited to the upward vertical direction. For example, if the selector switch is pressed when the projection unit 12 is in the horizontal projection position, the electronic control unit 70 may rotate the projection unit 12 to a tilted position in which the optical axis X is tilted upward at a larger angle with respect to the horizontal direction than in the horizontal projection position.

(Third Embodiment)

Figure 5A:
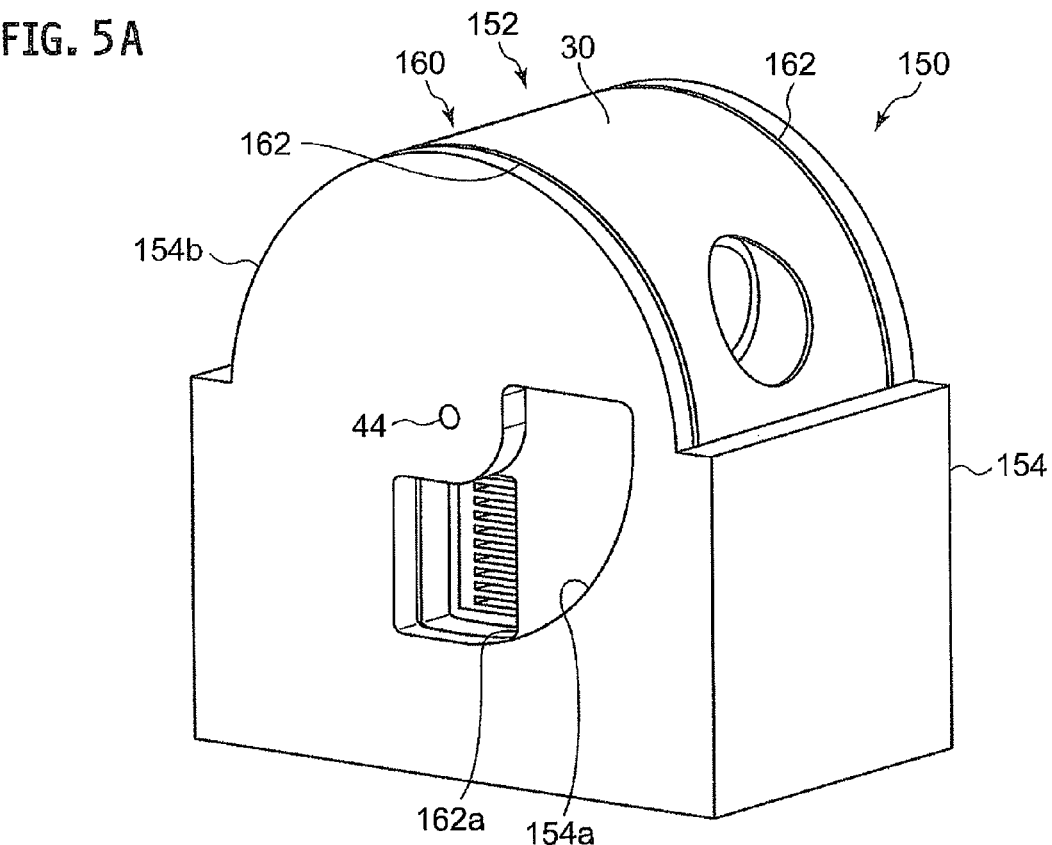
FIG. 5A is a perspective view of a projector according to a third embodiment.
Figure 5B:
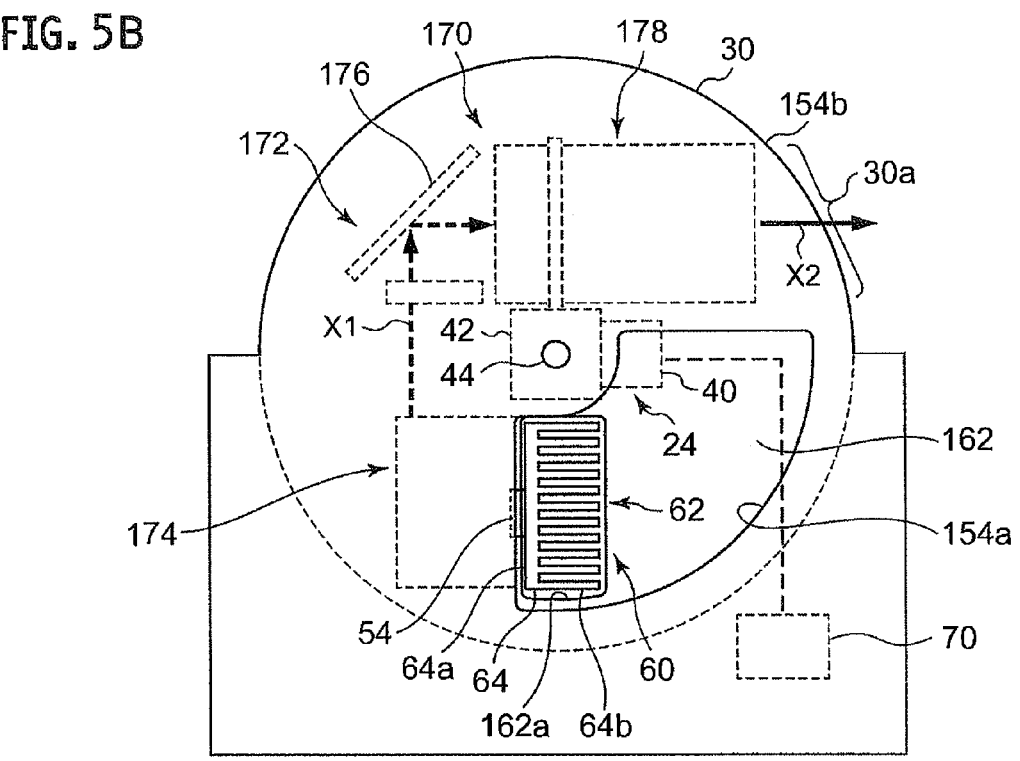
FIG. 5B is a side transparent view of the projector according to the third embodiment.

FIG. 5A is a perspective view of a projector 150 according to a third embodiment. FIG. 5B is a side transparent view of the projector 150 according to the third embodiment. Hereinafter, the same components as those in the embodiments described above are given the same reference numerals and the descriptions thereof will be omitted.

The projector 150 includes a projection unit 152 and a housing 154. The projection unit 152 is formed into a cylindrical shape and supported by the housing 154 so that the central axis of the projection unit 12 is directed in the horizontal direction. At this time, the housing 154 rotatably supports the projection unit 152. Therefore, the housing 154 functions as a support member.

The projection unit 152 includes a chassis 160, a projection mechanism 170, and a drive mechanism 24. The chassis 160 includes a cylindrical portion 30 and two sidewalls 162. The sidewalls 162 are provided to respectively cover openings of both ends of the cylindrical portion 30. FIG. 5B shows a state in which the sidewalls 162 are removed from the cylindrical portion 30 so that the inside of the projection unit 12 can be seen. A tubular portion having another shape may be provided instead of the cylindrical portion 30. For example, a tubular portion having a cross-sectional shape of a regular polygon such as a regular hexagon or a regular octagon may be provided.

The chassis 160 houses the projection mechanism 170. The projection mechanism 170 is fixed to the inside of the chassis 160. The projection mechanism 170 includes an optical unit 172 and a light source 54. The optical unit 172 includes a first optical unit 174, a mirror 176, and a second optical unit 178. The first optical unit 174 includes a spatial modulation element. Light emitted from the light source 54 is modulated when passing through the spatial modulation element in the first optical unit 174 and reflected by the mirror 176. The light reflected by the mirror 176 passes through the second optical unit 178 and is projected from the opening 30a. At this time, the light is reflected by the mirror 176 so that an optical axis X1 of the first optical unit 174 and an optical axis X2 of the second optical unit 178 are perpendicular to each other. The image projected from the opening 30a is formed on a screen provided outside the projector 150.

As shown in FIG. 5B, the optical axis X1 of the first optical unit 174 and the optical axis X2 of the second optical unit 178 are configured to surround the rotation axis of the projection unit 152, that is, the shaft 44. Therefore, the light source 54 is disposed so that the shaft 44 is located between the light source 54 and the opening 30a. When the optical unit 172 is configured as described above, if the projection unit 152 is rotated so that the opening 30a is located at an upper position to project an image, the light source 54 is located below the shaft 44. Therefore, as in the first and the second embodiments, if the upper end of the housing 154 is formed in substantially the same horizontal plane, when the opening 30a is located above the upper end of the housing, it is difficult to locate the light source 54 above the upper end of the housing 154 and it is also difficult to locate the duct openings at both ends of the duct 62 for dissipating heat above the upper end of the housing 154. Therefore, the housing 154 according to the third embodiment includes two continuous holes 154a. The two continuous holes 154a are provided in the right side surface and the left side surface of the housing 154, respectively.

FIG. 5A is a perspective view of the projector 150 according to the third embodiment when the projector 150 is in the horizontal projection position. FIG. 5B is a side transparent view of the projector 150 according to the third embodiment when the projector 150 is in the horizontal projection position. When the projection unit 152 is in the horizontal projection position, the projection unit 152 is positioned so that the optical axis X2 is directed to the horizontal forward direction. At this time, as shown in FIGS. 5A and 5B, the continuous holes 154a overlap the air holes 162a to allow the air holes 162a to communicate with the outside, so that the air holes 162a are uncovered.

Figure 6A:
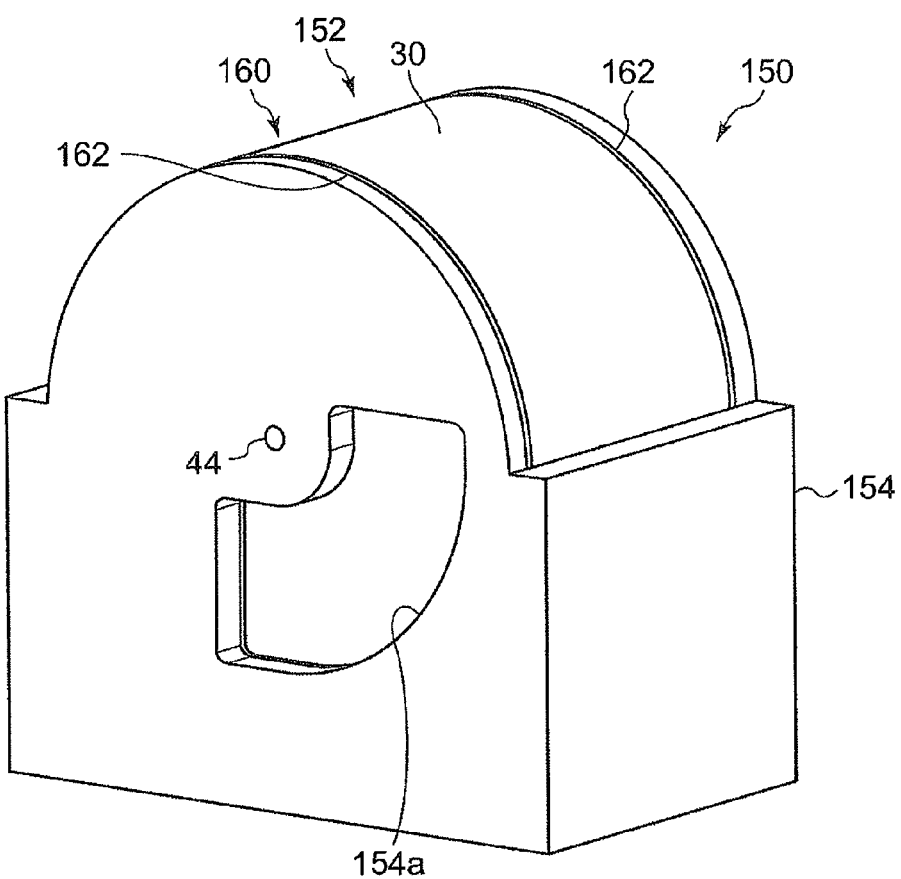
FIG. 6A is a perspective view of the projector according to the third embodiment when a projection unit is in a storage position.
Figure 6B:
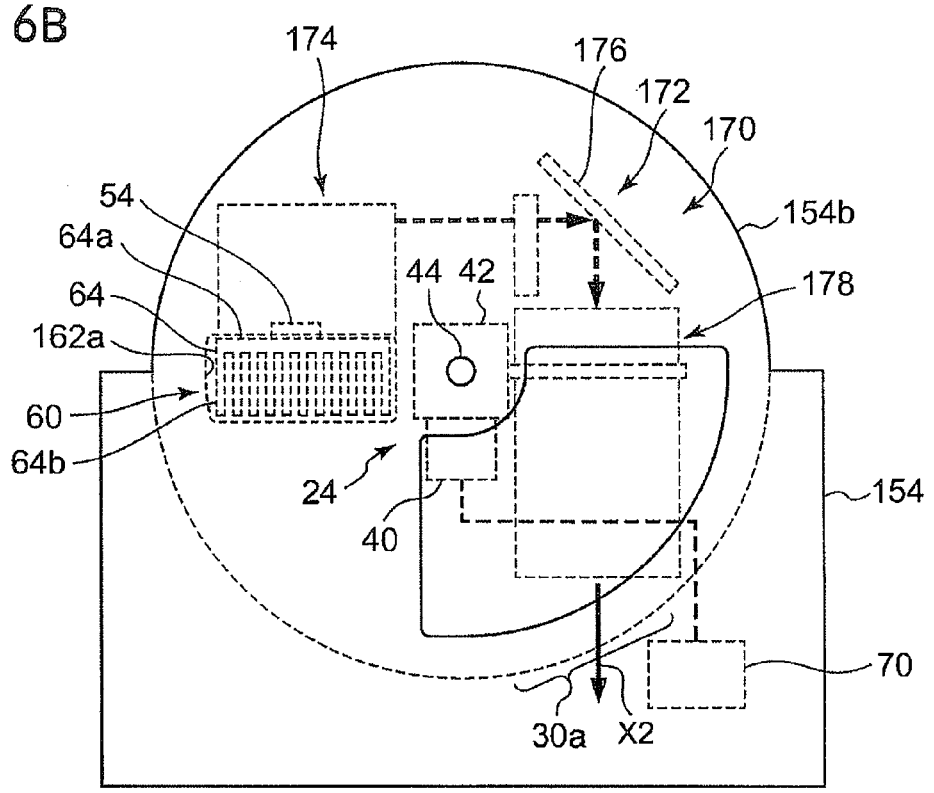
FIG. 6B is a side transparent view of the projector according to the third embodiment when the projection unit is in the storage position.

FIG. 6A is a perspective view of the projector 150 according to the third embodiment when the projection unit 152 is in the storage position. FIG. 6B is a side transparent view of the projector 150 according to the third embodiment when the projection unit 152 is in the storage position. When the projection unit 152 is in the storage position, the projection unit 152 is positioned so that the optical axis X2 is directed to the downward vertical direction. As shown in FIGS. 6A and 6B, when the projection unit 152 is in the storage position, the continuous holes 154a do not overlap the air holes 162a, so that the air holes 162a are covered.

The continuous holes 154a are provided in this way, so that even when the opening 30a and the light source 54 are located on the opposite sides to each other with respect to the rotation axis, both the opening 30a and the air holes 162a can be uncovered when the projection unit 152 is positioned in the horizontal projection position.

The housing 154 includes semicircular portions 154b which are formed along the outer circumference of the cylindrical portion 30. The semicircular portions 154b are provided at two positions along both ends of the cylindrical portion 30, respectively. The housing 154 is provided in this way, so that a sense of oneness of the appearance of the projection unit 152 and the housing 154 can be improved.

The continuous holes 154a are formed into an arc shape that represents a trajectory formed when the air hole 162a is rotated around the shaft 44 so that the continuous holes 154a overlap the air holes 162a even when the horizontal projection position is changed so that the optical axis X2 is tilted upward from the horizontal. Thereby, even when the direction of the optical axis X2 is changed, air can be appropriately taken in and exhausted out from the air holes 162a. The continuous holes 154a may be formed into a shape other than the arc shape.

Figure 7A:
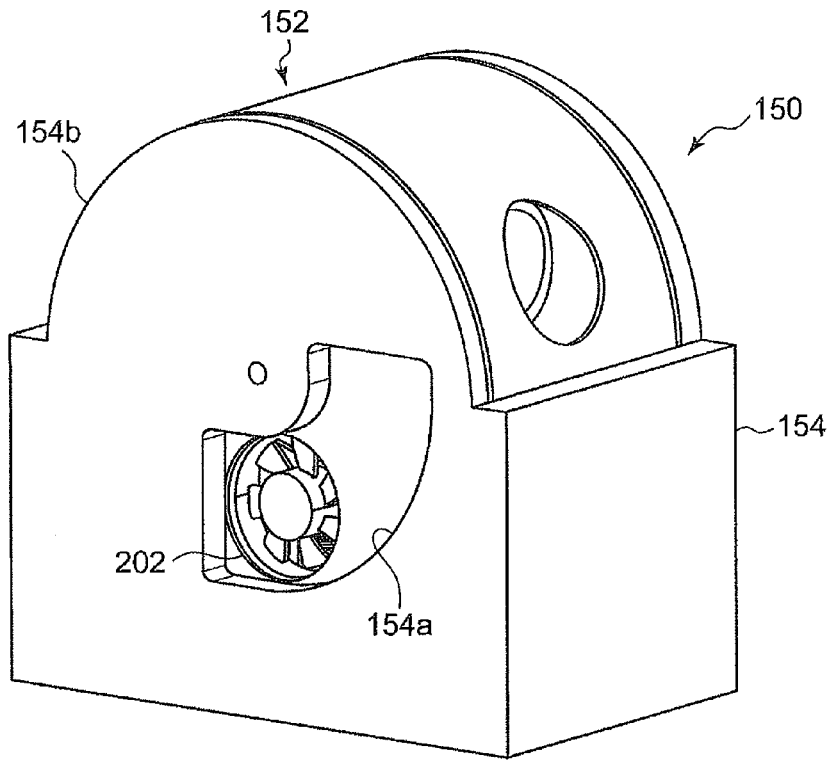
FIG. 7A is a perspective view of the projector according to the third embodiment when a fan is attached.
Figure 7B:
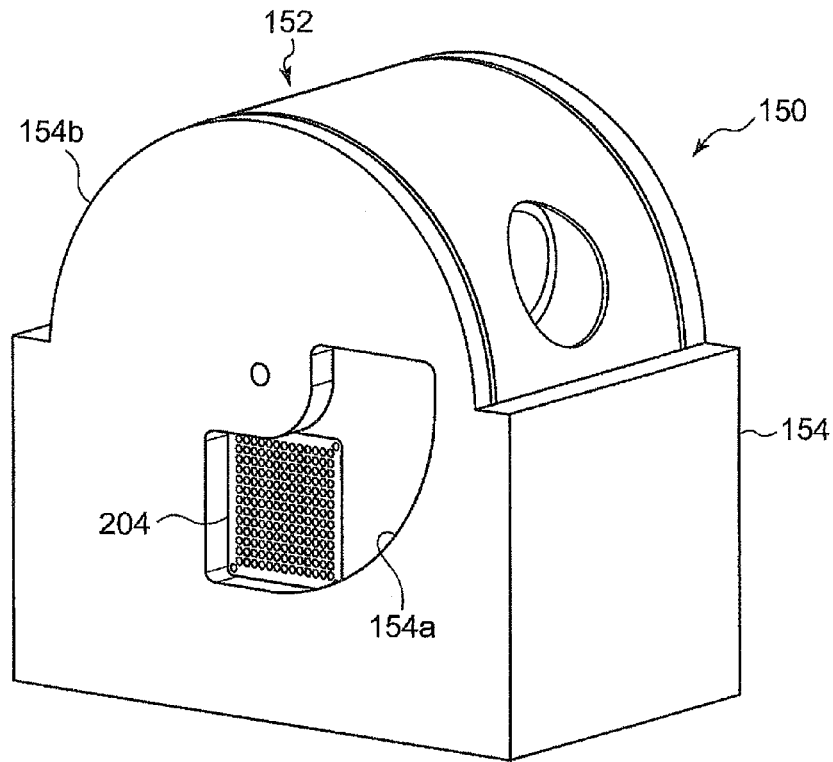
FIG. 7B is a perspective view of the projector according to the third embodiment when a filter is further attached.

FIG. 7A is a perspective view of the projector 150 according to the third embodiment when a fan 202 is attached to the projector 150. FIG. 7B is a perspective view of the projector 150 according to the third embodiment when a filter 204 is further attached to the projector 150. The electronic control unit 70 functions also as a fan control unit that controls operation of the fan 202. The fan 202 is disposed at one of the duct openings in both ends of the duct 62. The filter 204 is attached to the outside of the fan 202. When the fan 202 normally rotates, air is taken into the duct 62 from the outside. Thereby, a larger amount of air can be passed through near the heat dissipation fins 64b, so that the heat of the light source 54 can be appropriately dissipated.

When the projection unit 152 moves from the storage position to the horizontal projection position and the fan 202 overlaps the continuous hole 154a and communicates with the outside, the electronic control unit 70 activates the fan 202. The electronic control unit 70 reversely rotates the fan 202 at a predetermined timing when the projection unit 152 is in the horizontal projection position. Thereby, it is possible to blow away and remove dust and the like attached to the filer 204. The predetermined timing may be timing when the S/E button is pressed to turn off the power when the projection unit 152 is in the horizontal projection position or may be other timing.

(Fourth Embodiment)

Figure 8:
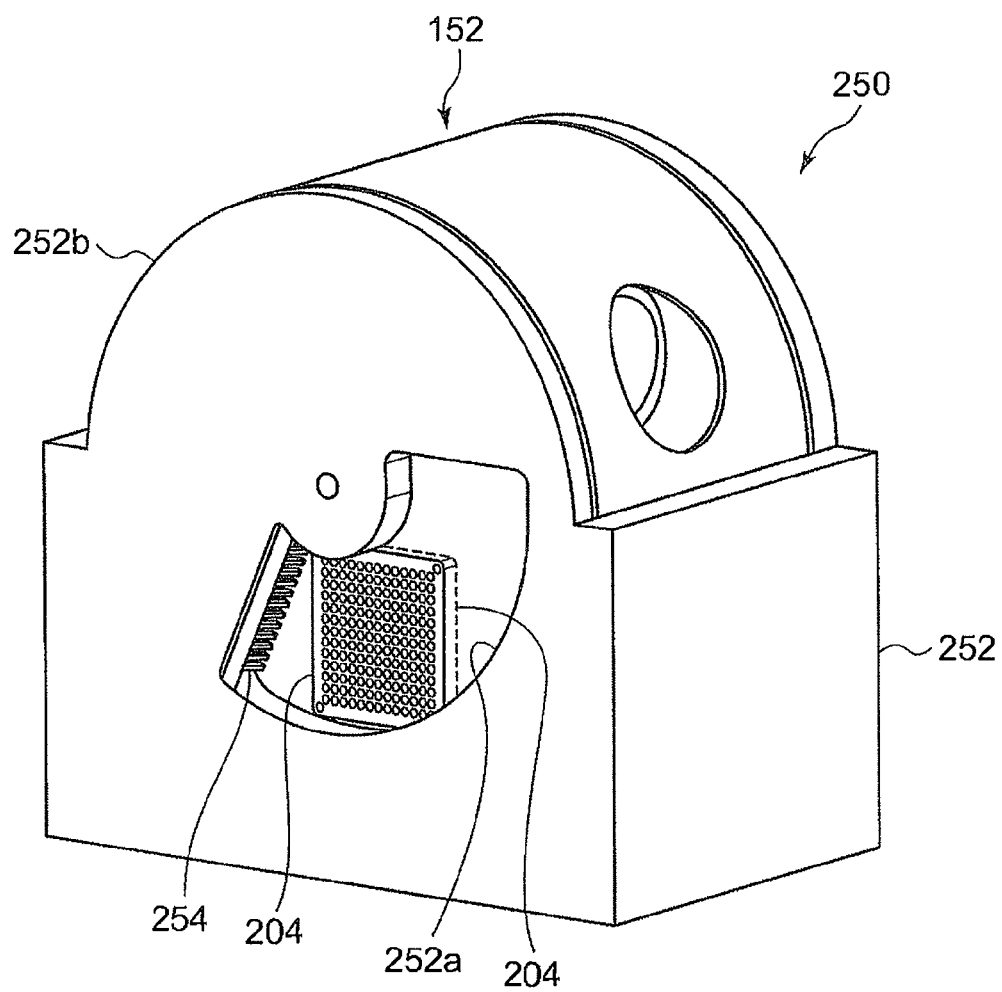
FIG. 8 is a perspective view of a projector according to a fourth embodiment.

FIG. 8 is a perspective view of a projector 250 according to a fourth embodiment. Hereinafter, the same components as those in the embodiments described above are given the same reference numerals and the descriptions thereof will be omitted.

The projector 250 is configured in the same manner as the projector 150 of the third embodiment except that a housing 252 is provided instead of the housing 154. The housing 252 is configured in the same manner as the housing 154 of the third embodiment except that continuous holes 252a are provided instead of the continuous holes 154a and a brush 254 is further provided. Therefore, the housing 252 has semicircular portions 252b that are the same as the semicircular portions 154b of the housing 154.

The continuous hole 252a is formed in the same manner as the continuous hole 154a except that the continuous hole 252a is formed larger than the continuous hole 154a in order to attach the brush 254. The brush 254 is disposed so that the brush 254 comes into contact with the surface of the filter 204 when the projection unit 152 rotates from the horizontal projection position to the storage position. The brush 254 is provided in this way, so that it is possible to clean the filter 204 when the projection unit 152 rotates.

When the projection unit 152 rotates from the horizontal projection position to the storage position, the electronic control unit 70 may reversely rotate the fan 202. Thereby, it is possible to blow away and remove dust and the like scraped out by the brush 254.

(Fifth Embodiment)

Figure 9A:
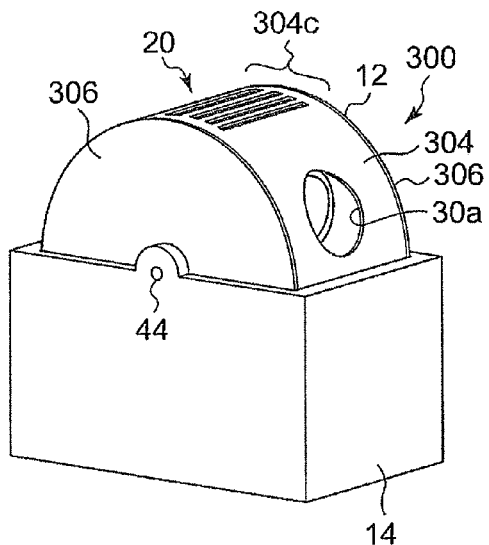
FIG. 9A is a perspective view, as seen from the front, of a projector according to a fifth embodiment.
Figure 9B:
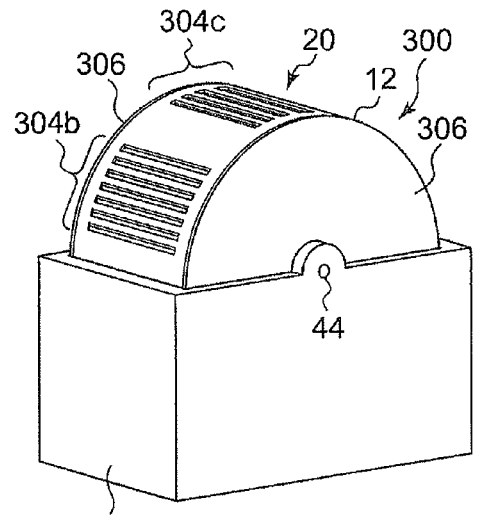
FIG. 9B is a perspective view, as seen from the rear, of the projector according to the fifth embodiment.
Figure 9C:
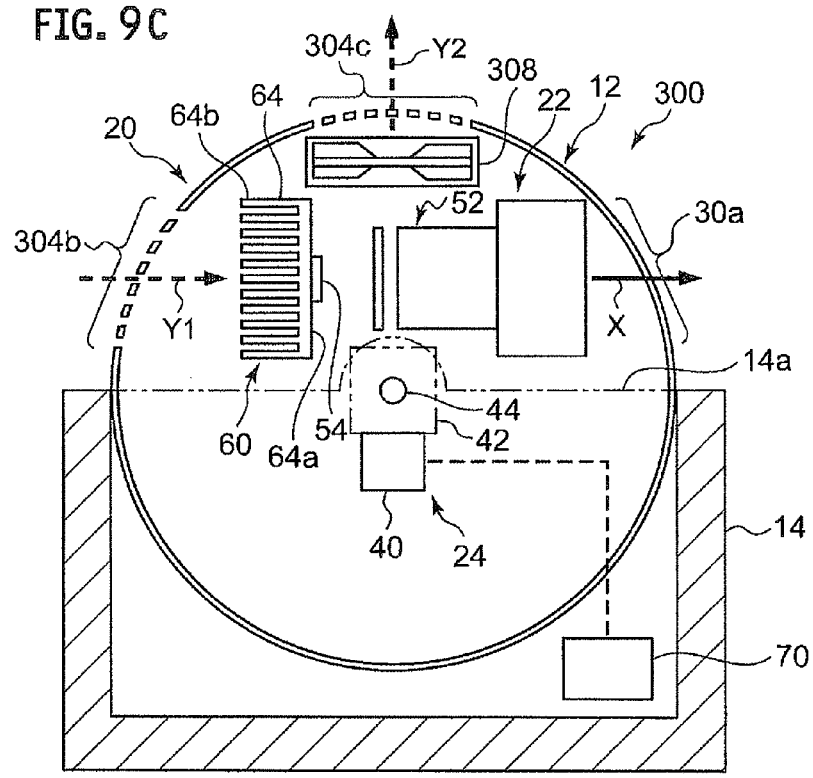
FIG. 9C is a side transparent view of the projector according to the fifth embodiment.

FIG. 9A is a perspective view, as seen from the front, of a projector 300 according to a fifth embodiment. FIG. 9B is a perspective view, as seen from the rear, of the projector 300 according to the fifth embodiment. FIG. 9C is a side transparent view of the projector 300 according to the fifth embodiment. Hereinafter, the same components as those in the embodiments described above are given the same reference numerals and the descriptions thereof will be omitted.

The projector 300 is configured in the same manner as the projector 10 of the first embodiment except that a cylindrical portion 304 is provided instead of the cylindrical portion 30 and sidewalls 306 are provided instead of the sidewalls 32. The cylindrical portion 304 is configured in the same manner as the cylindrical portion 30 except that an intake hole 304b, an exhaust hole 304c, and a fan 308 are further provided. The sidewall 306 is formed in the same manner as the sidewall 32 except that the air hole 32a is covered.

The intake hole 304b is disposed in the cylindrical portion 304 on the opposite side of the opening 30a in a state in which the projector 300 is in the horizontal projection position. The exhaust hole 304c is disposed in the cylindrical portion 304 at the middle position between the opening 30a and the intake hole 304b. The exhaust hole 304c opens upward in a state in which the projector 300 is in the horizontal projection position. The fan 308 is disposed inside the projection unit 12 and near the exhaust hole 304c. Therefore, air Y1 taken in from the intake hole 304b passes through the heat sink 64 in the heat dissipation mechanism 60 disposed near the intake hole 304b and is exhausted out as air Y2 from the exhaust hole 304c through the fan 308.

FIGS. 9A to 9C show the projector 300 when the projection unit 12 is in the horizontal projection position. When the projection unit 12 is set to the horizontal projection position, the projection unit 12 is positioned so that the optical axis X is directed to the horizontal forward direction.

Also in the fifth embodiment, when the projection unit 12 is in the horizontal projection position, the opening 30a is located above the upper end 14a of the housing 14. Therefore, the housing 14 is provided so that when the projection unit 12 is in the horizontal projection position, the opening 30a is uncovered. At this time, the intake hole 304b and the exhaust hole 304c are also located above the upper end 14a of the housing 14. Therefore, the housing 14 is provided so that when the projection unit 12 is in the horizontal projection position, the intake hole 304b and the exhaust hole 304c are also uncovered.

Figure 10A:
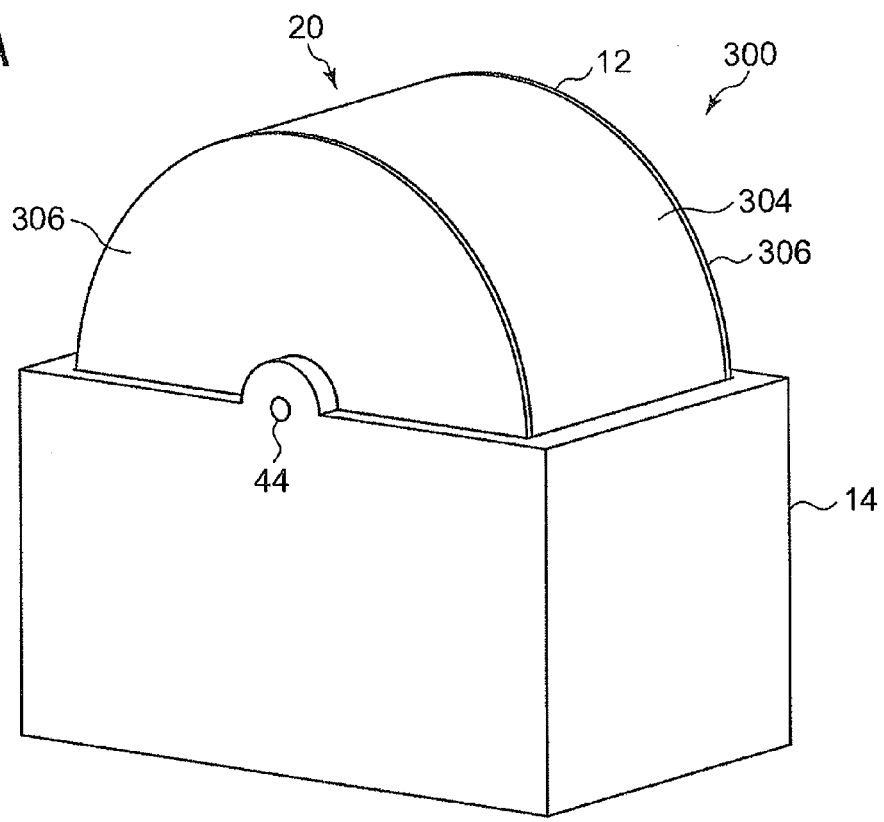
FIG. 10A is a perspective view of the projector according to the fifth embodiment when a projection unit is in a storage position.
Figure 10B:
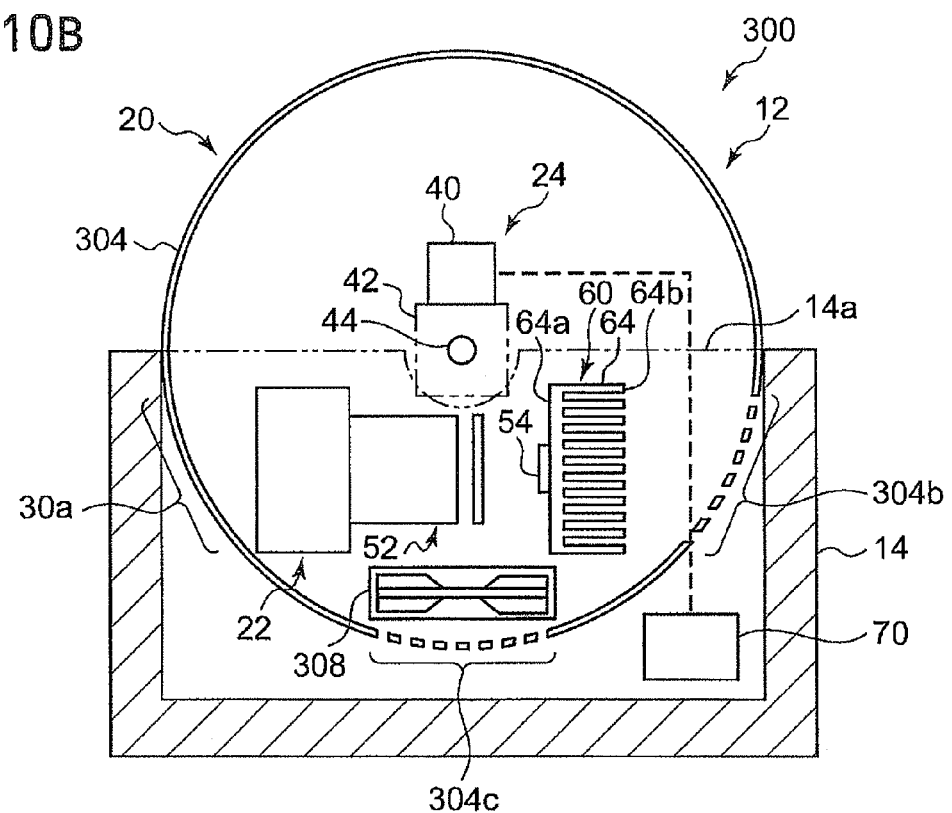
FIG. 10B is a side transparent view of the projector according to the fifth embodiment when the projection unit is in the storage position.

FIG. 10A is a perspective view of the projector 300 when the projection unit 12 is in the storage position. FIG. 10B is a side transparent view of the projector 300 when the projection unit 12 is in the storage position. When the projection unit 12 is in the storage position, the projection unit 12 is positioned so that the optical axis X is directed to the horizontal backward direction.

When the electronic control unit 70 moves the projection unit 12 to the storage position, in the same manner as in the first embodiment, the electronic control unit 70 rotates the projection unit 12 so that the optical axis X is directed to the horizontal backward direction. Also in the fifth embodiment, when the projection unit 12 is in the storage position, the opening 30a is located below the upper end 14a of the housing 14. Therefore, the housing 14 is provided so that when the projection unit 12 is in the storage position, the opening 30a is covered. At this time, the intake hole 304b and the exhaust hole 304c are also located below the upper end 14a of the housing 14. Therefore, the housing 14 is provided so that when the projection unit 12 is in the storage position, the intake hole 304b and the exhaust hole 304c are also covered.

(Sixth Embodiment)

Figure 11A:
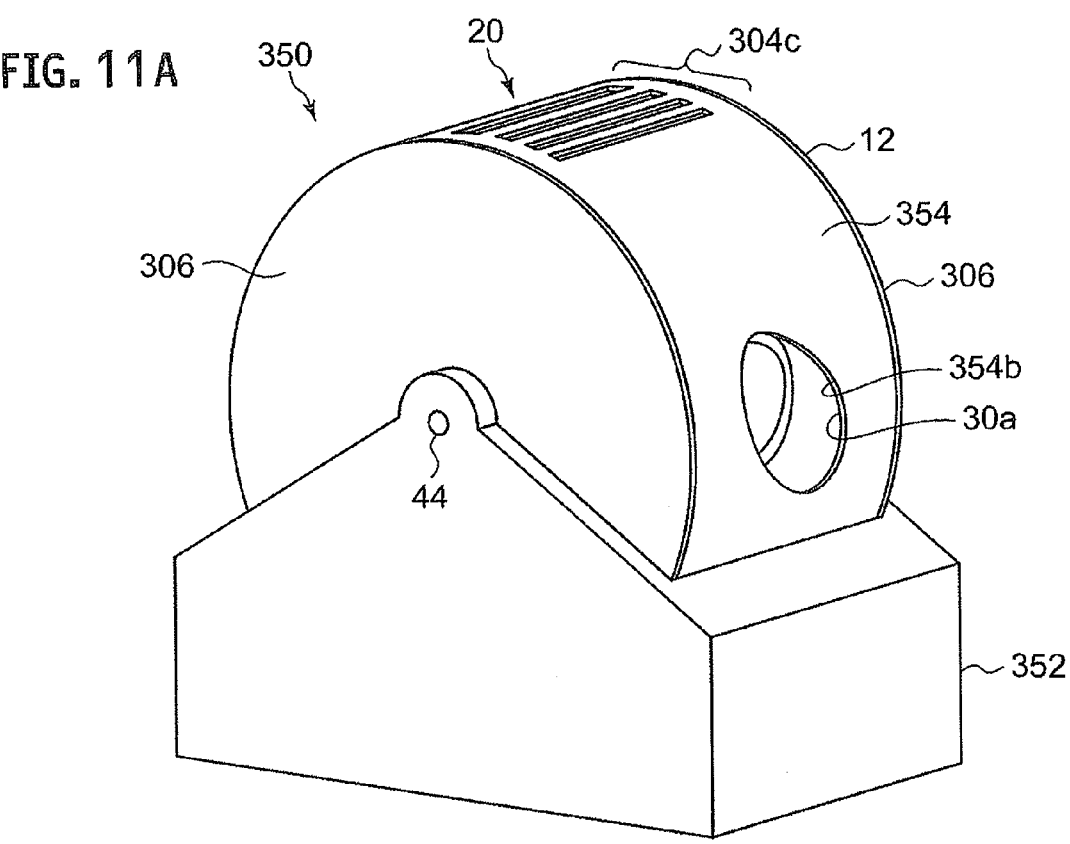
FIG. 11A is a perspective view of a projector according to a sixth embodiment.
Figure 11B:
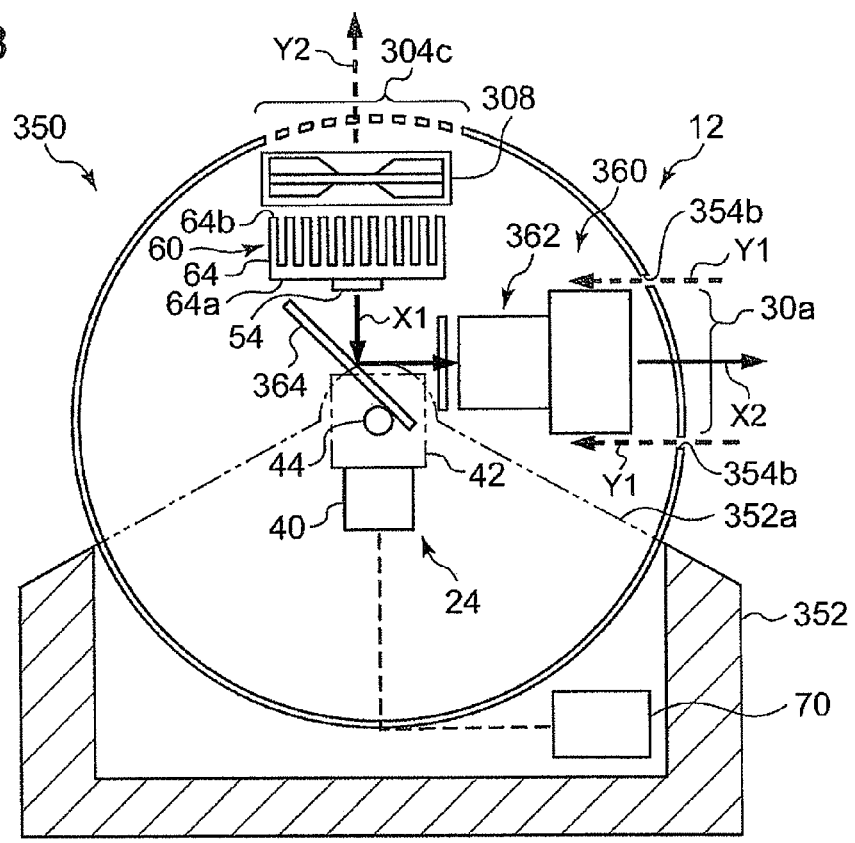
FIG. 11B is a side transparent view of the projector according to the sixth embodiment.

FIG. 11A is a perspective view, as seen from the front, of a projector 350 according to a sixth embodiment. FIG. 11B is a side transparent view of the projector 350 according to the sixth embodiment. Hereinafter, the same components as those in the embodiments described above are given the same reference numerals and the descriptions thereof will be omitted.

The projector 350 is configured in the same manner as the projector 300 of the fifth embodiment except that a housing 352 is provided instead of the housing 14, a cylindrical portion 354 is provided instead of the cylindrical portion 304, and a projection mechanism 360 is provided instead of the projection mechanism 22.

A side surface of the housing 352, which supports the shaft 44, has a pentagonal shape. The pentagonal shape is formed by cutting off the upper front corner and the upper rear corner of the rectangular side surface of the housing 14 of the fifth embodiment so that a pentagonal shape having the shaft 44 as an apex is formed. The cylindrical portion 354 is configured in the same manner as the cylindrical portion 304 except that an intake hole 354b is provided around the opening 30a instead of the intake hole 304b.

The projection mechanism 360 includes an optical unit 362, a mirror 364, and a light source 54. The optical unit 362 includes a spatial modulation element. The light emitted from the light source 54 is reflected by the mirror 364, passes through the optical unit 362, and is projected from the opening 30a. At this time, the light is reflected by the mirror 364 so that an optical axis X1 of the light source 54 and an optical axis X2 of the optical unit 362 are perpendicular to each other. The image projected from the opening 30a is formed on a screen provided outside the projector 350.

In a state in which the projector 350 is in the horizontal projection position, the intake hole 354b is disposed in the front portion of the projector 350 in the same manner as the opening 30a and the exhaust hole 304c is disposed to open upward. Therefore, air Y1 taken in from the intake hole 354b passes through the heat sink 64 in the heat dissipation mechanism 60 disposed near the fan 308 and is exhausted out as air Y2 from the exhaust hole 304c through the fan 308. The intake hole 354b may be provided around the opening 30a separately from the opening 30a or may be provided integrally with the opening 30a by using a gap between the transparent cover provided to the opening 30a and the cylindrical portion 354.

FIGS. 11A and 11B show the projector 350 when the projection unit 12 is in the horizontal projection position. When the projection unit 12 is set to the horizontal projection position, the projection unit 12 is positioned so that the optical axis X is directed to the horizontal forward direction.

Also in the sixth embodiment, when the projection unit 12 is in the horizontal projection position, the opening 30a is located above the upper end 352a of the housing 352. Therefore, the housing 352 is provided so that when the projection unit 12 is in the horizontal projection position, the opening 30a is uncovered. At this time, the intake hole 354b and the exhaust hole 304c are also located above the upper end 352a of the housing 352. Therefore, the housing 352 is provided so that when the projection unit 12 is in the horizontal projection position, the intake hole 354b and the exhaust hole 304c are also uncovered.

Figure 12:
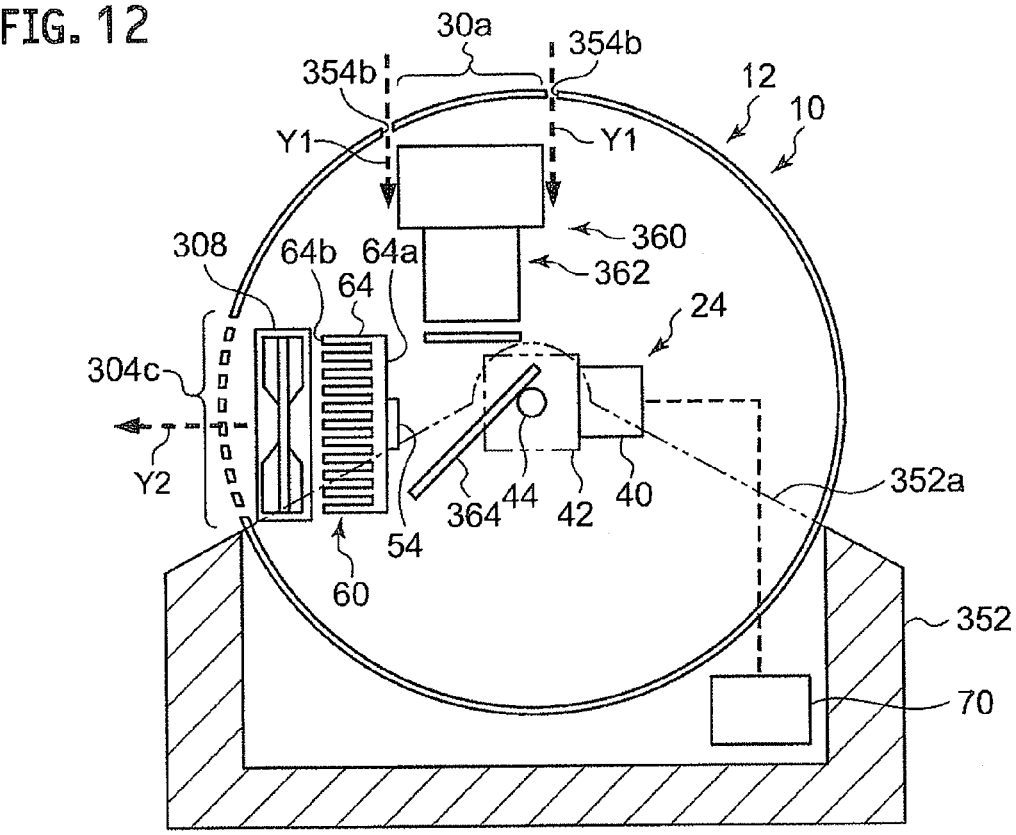
FIG. 12 is a side transparent view of the projector according to the sixth embodiment when projecting an image in the upward vertical direction.

FIG. 12 is a side transparent view of the projector 350 according to the sixth embodiment when the projector 350 projects an image in the upward vertical direction. If the selector switch is pressed when the projection unit 12 is in the horizontal projection position, the electronic control unit 70 controls the drive mechanism 24 to rotate the projection unit 12 to the vertical projection position.

When the projection unit 12 is in the vertical projection position, the opening 30a is located above the upper end 352a of the housing 352. Therefore, the housing 352 is provided so that when the projection unit 12 is in the vertical projection position, the opening 30a is uncovered. At this time, the intake hole 354b and the exhaust hole 304c are also located above the upper end 352a of the housing 352. Therefore, the housing 352 is provided so that when the projection unit 12 is in the vertical projection position, the intake hole 354b and the exhaust hole 304c are also uncovered.

Figure 13:
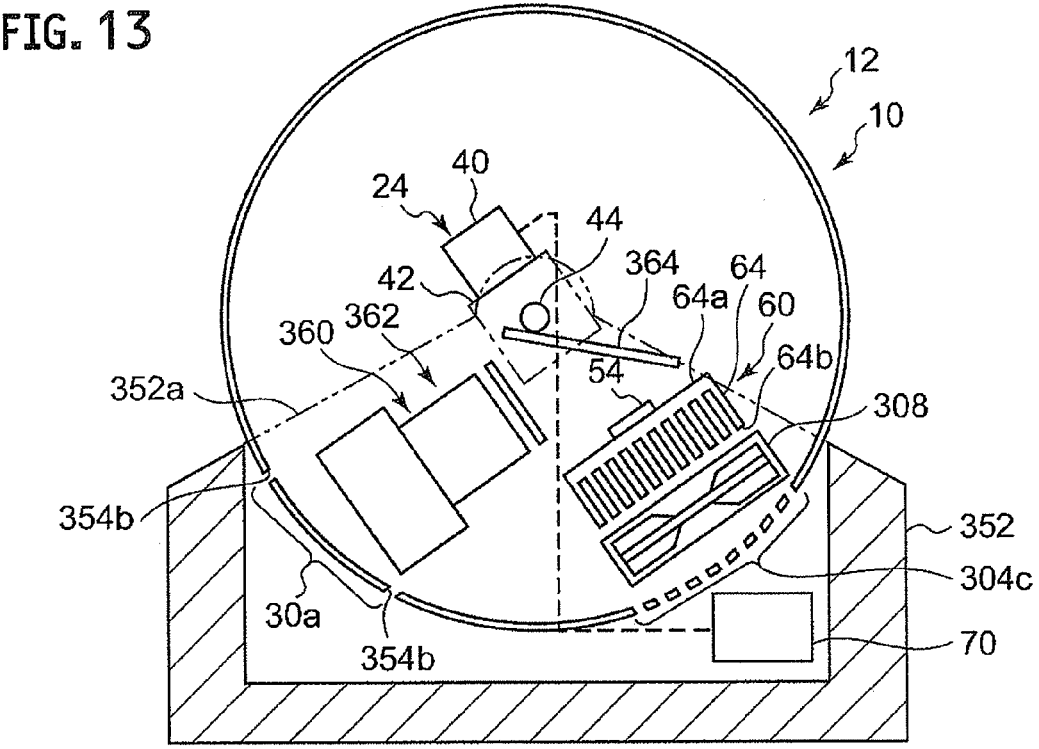
FIG. 13 is a side transparent view of the projector according to the sixth embodiment when a projection unit is in a storage position.

FIG. 13 is a side transparent view of the projector 350 according to the sixth embodiment when the projection unit 12 is in the storage position. When the projection unit 12 is in the storage position, the projection unit 12 is positioned so that the optical axis X2 is directed to a rearward and downward direction rotated by about 140 degrees from the horizontal direction.

When the electronic control unit 70 moves the projection unit 12 to the storage position, the electronic control unit 70 rotates the projection unit 12 so that the optical axis X2 is directed to the rearward and downward direction rotated by about 140 degrees from the horizontal direction. Also in the sixth embodiment, when the projection unit 12 is in the storage position, the opening 30a is located below the upper end 352a of the housing 352. Therefore, the housing 352 is provided so that when the projection unit 12 is in the storage position, the opening 30a is covered. At this time, the intake hole 354b and the exhaust hole 304c are also located below the upper end 352a of the housing 352. Therefore, the housing 352 is provided so that when the projection unit 12 is in the storage position, the intake hole 354b and the exhaust hole 304c are also covered.

In this way, the intake hole 354b is disposed around the opening 30a and the exhaust hole 304c is disposed at a position rotated by 90 degrees from the position of the opening 30a, so that when the opening 30a is uncovered, the intake hole 354b and the exhaust hole 304c can be also uncovered. Therefore, the projection unit 12 can be rotated by a larger angle while air can be taken in from the intake hole 354b and exhausted out from the exhaust hole 304c, so that the direction to which the optical axis X2 is directed can be largely changed.

The direction to which the optical axis X is directed by the selector switch is not limited to the upward vertical direction. For example, if the selector switch is pressed when the projection unit 12 is in the horizontal projection position, the electronic control unit 70 may rotate the projection unit 12 to a tilted position in which the optical axis X is tilted upward at a larger angle with respect to the horizontal direction in comparison with the horizontal projection position.

(Seventh Embodiment)

Figure 14A:
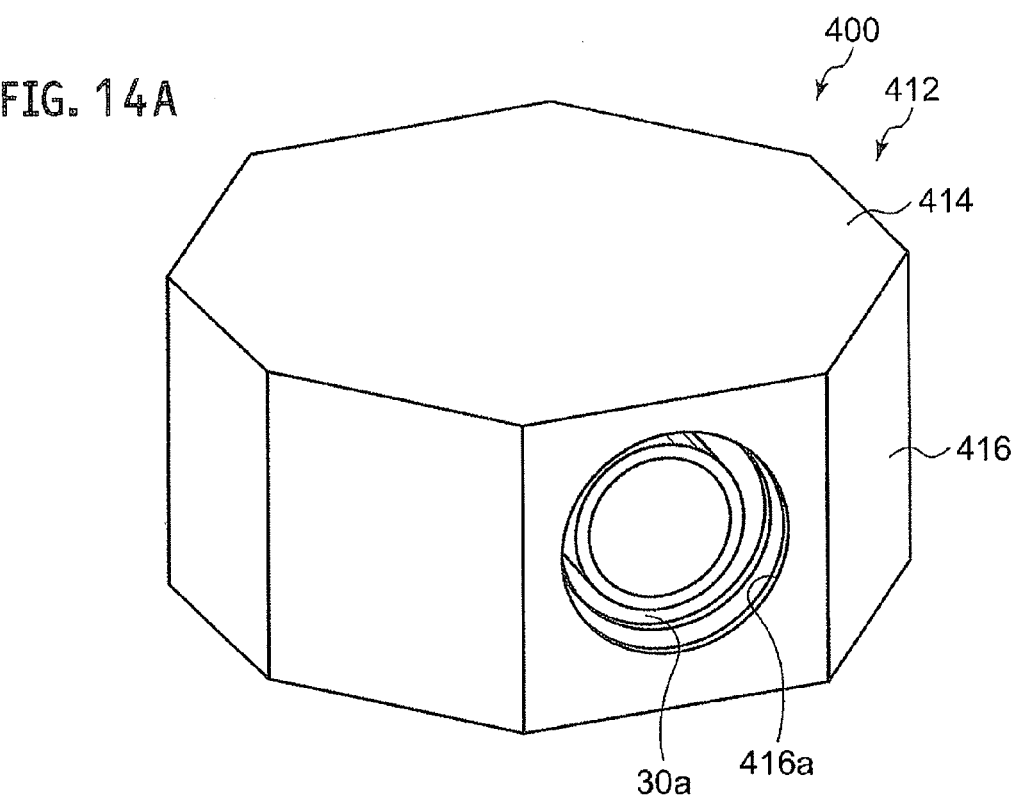
FIG. 14A is a perspective view, as seen from the front, of a projector according to a seventh embodiment.
Figure 14B:
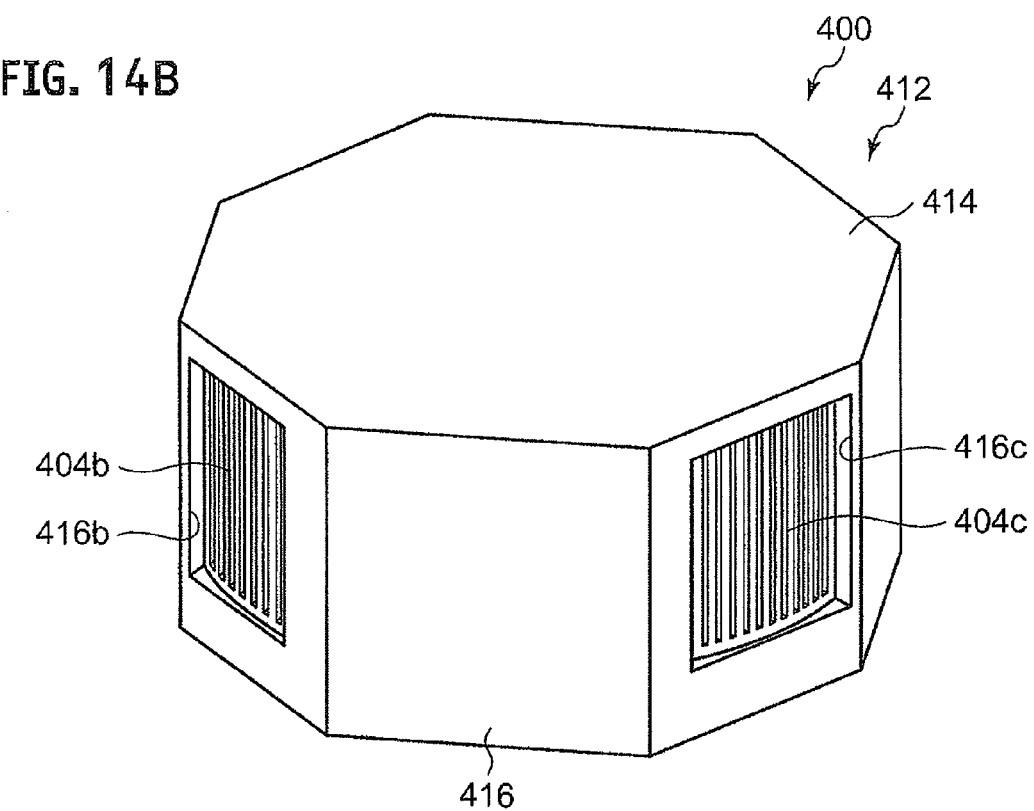
FIG. 14B is a perspective view, as seen from the rear, of the projector according to the seventh embodiment.
Figure 15A:
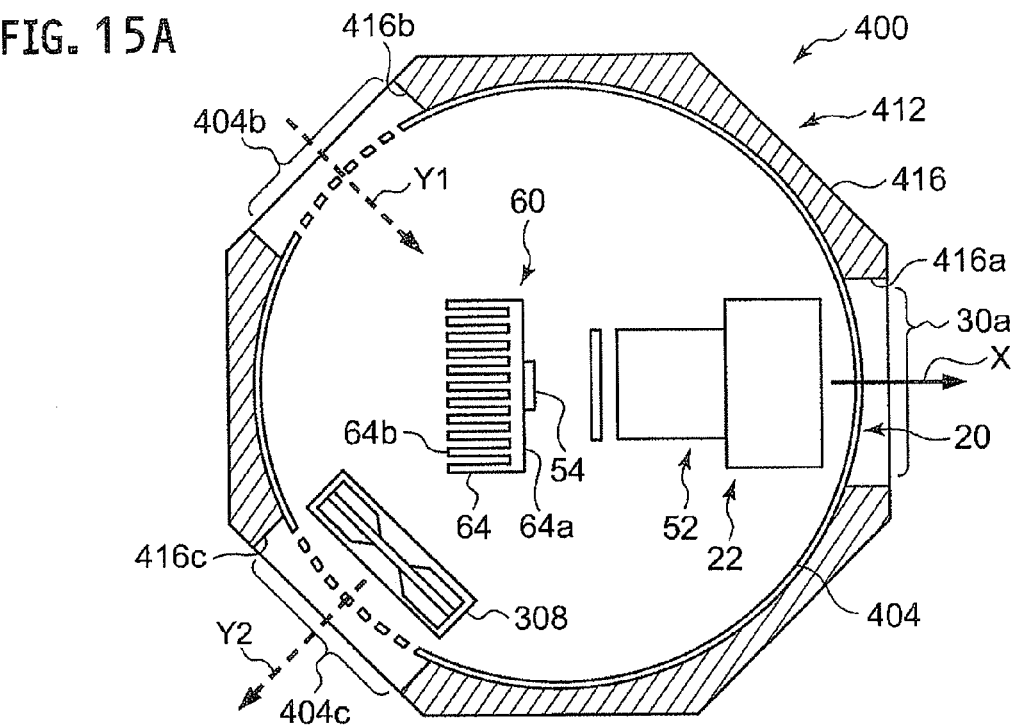
FIG. 15A is a top transparent view of the projector according to the seventh embodiment when a projection unit is in a projection position.
Figure 15B:
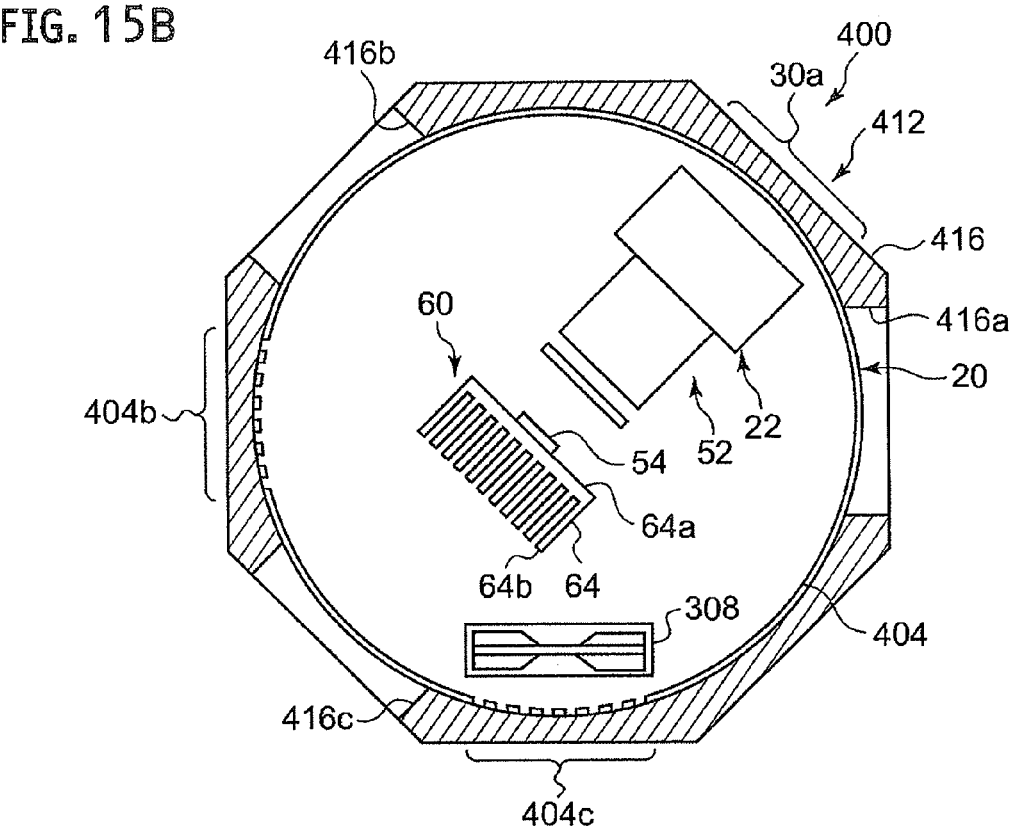
FIG. 15B is a top transparent view of the projector according to the seventh embodiment when the projection unit is in a storage position.

FIG. 14A is a perspective view of a projector 400 according to a seventh embodiment as seen from the front when the opening 30a is located in the front portion of the projector 400. FIG. 14B is a perspective view, as seen from the rear, of the projector 400 according to the seventh embodiment. FIGS. 15A and 15B are top transparent views of the projector 400 according to the seventh embodiment. Hereinafter, the same components as those in the embodiments described above are given the same reference numerals and the descriptions thereof will be omitted.

The projector 400 is configured in the same manner as the projector 300 of the fifth embodiment except that a housing 412 is provided instead of the housing 14 and a cylindrical portion 404 is provided instead of the cylindrical portion 304. The projector 400 has a configuration in which the projection unit 12 is rotated in the housing 412. In the above embodiment, the cylindrical portion 404 is configured in the same manner as the cylindrical portion 304 except that an intake hole 404b and an exhaust hole 404c are provided instead of the intake hole 304b and the exhaust hole 304c.

The housing 412 has a shape of a regular octagonal prism. The housing 412 includes two housing bottom portions 414 having a regular octagonal shape and a housing side portion 416 in which eight rectangular surfaces are connected. An insertion hole (not shown in the drawings) is provided at the center of each of the two housing bottom portions 414 and the shaft 44 is rotatably inserted into the insertion holes. In this way, the housing 412 rotatably supports the projection unit 12 and the central axis of the cylindrical portion 404 is the rotation axis of the projection unit 12. A housing opening 416a, a housing intake hole 416b, and a housing exhaust hole 416c are respectively provided in three rectangular surfaces of the eight rectangular surfaces in the housing side portion 416. Specifically, when a surface of the housing side portion 416 in which the housing opening 416a is provided is defined as a first surface and the other surfaces are defined as second to eighth surfaces in counterclockwise order from the first surface, the housing intake hole 416b is provided in the fourth surface of the housing side portion 416 and the housing exhaust hole 416c is provided in the sixth surface of the housing side portion 416. The housing 412 may have a shape of another regular polygonal prism such as a regular hexagonal prism or may have a cylindrical shape.

The opening 30a, the intake hole 404b, and the exhaust hole 404c are disposed in the cylindrical portion 404 so that the opening 30a, the intake hole 404b, and the exhaust hole 404c overlap the housing opening 416a, the housing intake hole 416b, and the housing exhaust hole 416c, respectively and communicate with the outside in a state in which the projector 400 is in a projection position. The fan 308 is disposed inside the projection unit 12 and near the exhaust hole 404c. Therefore, air Y1 taken in from the intake hole 404b passes through the heat sink 64 in the heat dissipation mechanism 60 disposed inside the projection unit 12 and is exhausted out as air Y2 from the exhaust hole 404c through the fan 308.

FIG. 15A is a top transparent view of the projector 400 when the projection unit 12 is in the projection position. When the projection unit 12 is set to the projection position, the projection unit 12 is positioned so that the optical axis X is projected to the outside through the housing opening 416a.

FIG. 15B is a top transparent view showing the projector 400 when the projection unit 12 is in a storage position. When the projection unit 12 is in the storage position, the projection unit 12 is positioned so that the optical axis X is directed to a direction rotated by 45 degrees with respect to the projection position.

When the electronic control unit 70 moves the projection unit 12 to the storage position, the electronic control unit 70 rotates the projection unit 12 so that the optical axis X is directed to the direction rotated by 45 degrees with respect to the projection position. In the seventh embodiment, when the projection unit is in the storage position, the opening 30a, the intake hole 404b, and the exhaust hole 404c do not overlap the housing opening 416a, the housing intake hole 416b, and the housing exhaust hole 416c, respectively and the opening 30a, the intake hole 404b, and the exhaust hole 404c are covered by the housing side portion 416. Therefore, the housing 412 is provided so that when the projection unit 12 is in the storage position, the housing 412 covers the opening 30a, the intake hole 404b, and the exhaust hole 404c.

Although, in the description of the seventh embodiment, the projector 400 is placed with the housing bottom portion 414 facing down, the projector 400 may be placed with a surface of the housing side portion 416, which does not include the housing opening 416a, the housing intake hole 416b, or the housing exhaust hole 416c, facing down.

(Eighth Embodiment)

Figure 16A:
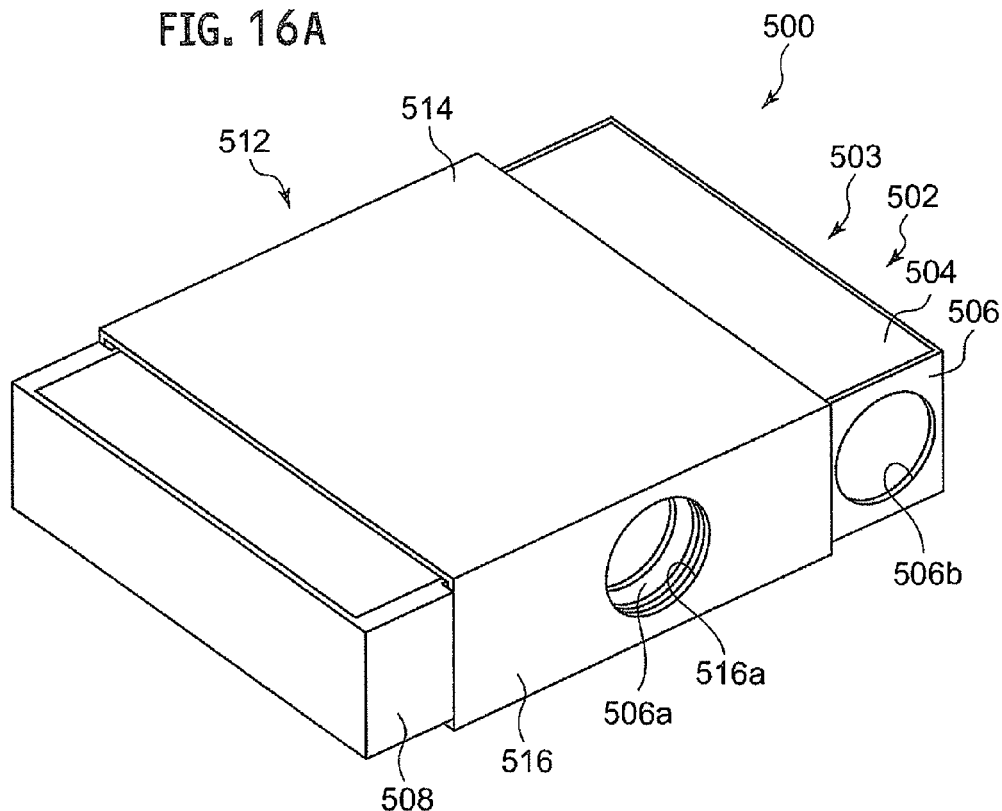
FIG. 16A is a perspective view of a projector according to an eighth embodiment when a cover is in a projection position.
Figure 16B:
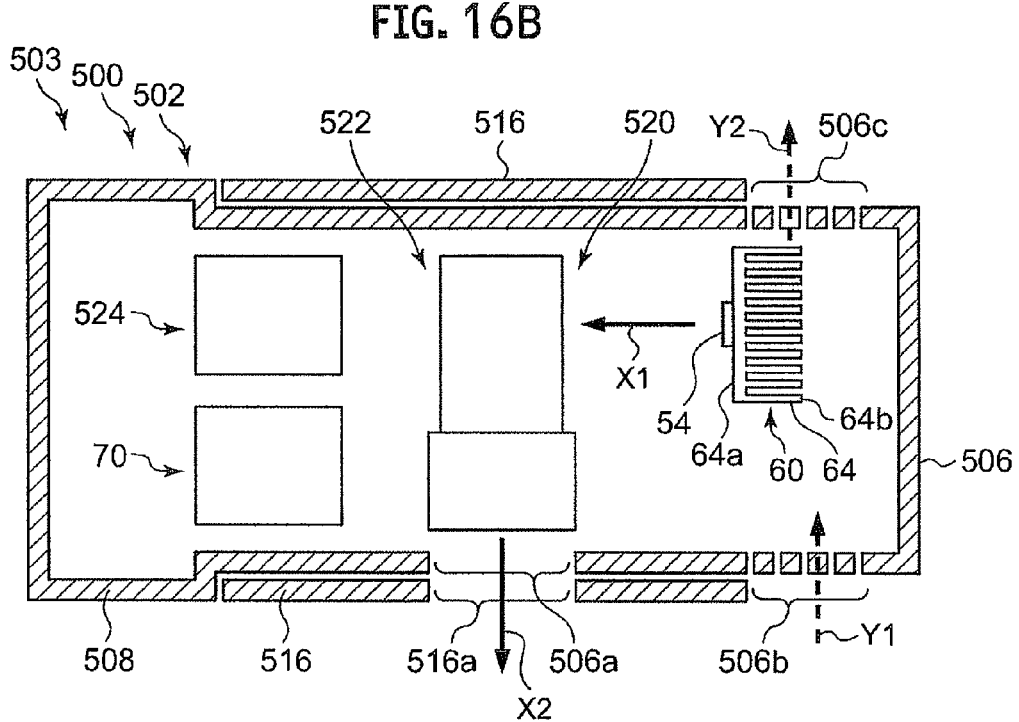
FIG. 16B is a top transparent view of the projector according to the eighth embodiment when the cover is in the projection position.

FIG. 16A is a perspective view of a projector 500 according to an eighth embodiment. FIG. 16B is a top transparent view of the projector 500 according to the eighth embodiment. The projector 500 includes a projection unit 502 and a cover 512. The projection unit 502 has a chassis 503 having a substantially rectangular solid shape. A projection mechanism 520, a drive mechanism 524, a heat dissipation mechanism 60, and an electronic control unit 70 are provided inside the chassis 503.

The chassis 503 has two bottom portions 504 corresponding to an upper surface and a lower surface and four side portions 506 including a front surface and a rear surface. The bottom portions 504 are provided in the horizontal direction and function as support members of the projector 500. An opening 506a is provided in the front surface of the side portions 506. The projection mechanism 520 projects an image to the outside through the opening 506a. An intake hole 506b is provided in the front surface of the side portions 506. An exhaust hole 506c is provided in the rear surface of the side portions 506, which opposes the front surface.

The cover 512 has a tubular shape whose cross section is rectangle and which includes two cover bottom portions 514 corresponding to an upper surface and a lower surface and two cover side portions 516 corresponding to a front surface and a rear surface. The cover 512 is slidably attached to the chassis 503 so that the cover 512 can slide in the horizontal direction along the bottom portions 504 and the side portions 506 of the chassis 503. A cover opening 516a is provided in the front surface of the cover side portions 516. When the cover opening 516a overlaps the opening 506a, an image is projected to the outside through the cover opening 516a.

Protrusion portions 508 are provided on the side portions 506 respectively. When the cover 512 is pressed to the protrusion portions 508, the cover 512 is positioned at a position where the opening 506a and the cover opening 516a overlap each other. The horizontal length of the cover 512 is adjusted so that the cover side portions 516 do not cover the intake hole 506b and the exhaust hole 506c when the cover 512 is pressed to the protrusion portions 508.

The projection mechanism 520 includes a light source 54 and an optical unit 522 and is fixed to the inside of the chassis 503. In the same manner as the optical unit 52 of the first embodiment, the optical unit 522 includes a plurality of lenses and a mirror that reflects light so that an optical axis X1 of the light source 54 and an optical axis X2 of the optical unit 522 are perpendicular to each other.

The drive mechanism 524 includes a motor 526, a power transmission mechanism 528, and a guide rail 530 (not shown in the drawings). The guide rail 530 is attached to the outside of the chassis 503 and slidably supports the cover 512 so that the cover 512 can slide in the horizontal direction. The power transmission mechanism 528 provides a drive force in the horizontal direction to the cover 512 through the motor 526. As the drive mechanism 524, for example, a mechanism including a stepping motor and a lead screw, a belt mechanism, or a linear motor mechanism is employed.

The heat dissipation mechanism 60 is used to dissipate the heat of the light source 54 in the same manner as in the first embodiment. Specifically, air Y1 taken in from the intake hole 506b passes through the heat sink 64 in the heat dissipation mechanism 60 and is exhausted out as air Y2 from the exhaust hole 506c. A fan (not shown in the drawings) maybe provided near the exhaust hole 506c. As described in the first embodiment, the inside area and the air passing area may be separated from each other by the heat sink 64.

When receiving a projection preparation request, the electronic control unit 70 controls the drive mechanism 524 to slide the cover 512 to the projection position. Specifically, the electronic control unit 70 causes the cover 512 to slide leftward until the cover 512 is pressed to the protrusion portions 508. When receiving a projection prevention request, the electronic control unit 70 controls the drive mechanism 524 to slide the cover 512 to the storage position. Specifically, the electronic control unit 70 causes the cover 512 to slide rightward until the cover 512 comes to a position in which the opening 506a and the cover opening 516a do not overlap each other and the opening 506a is covered by the cover 512.

FIGS. 16A and 16B show the projector 500 when the cover 512 is in the projection position. At this time, the cover opening 516a is in a position in which the cover opening 516a overlaps the opening 506a and the projection mechanism 520 can project an image to the outside through the opening 506a and the cover opening 516a. The intake hole 506b and the exhaust hole 506c are not covered by the cover 512.

Figure 17A:
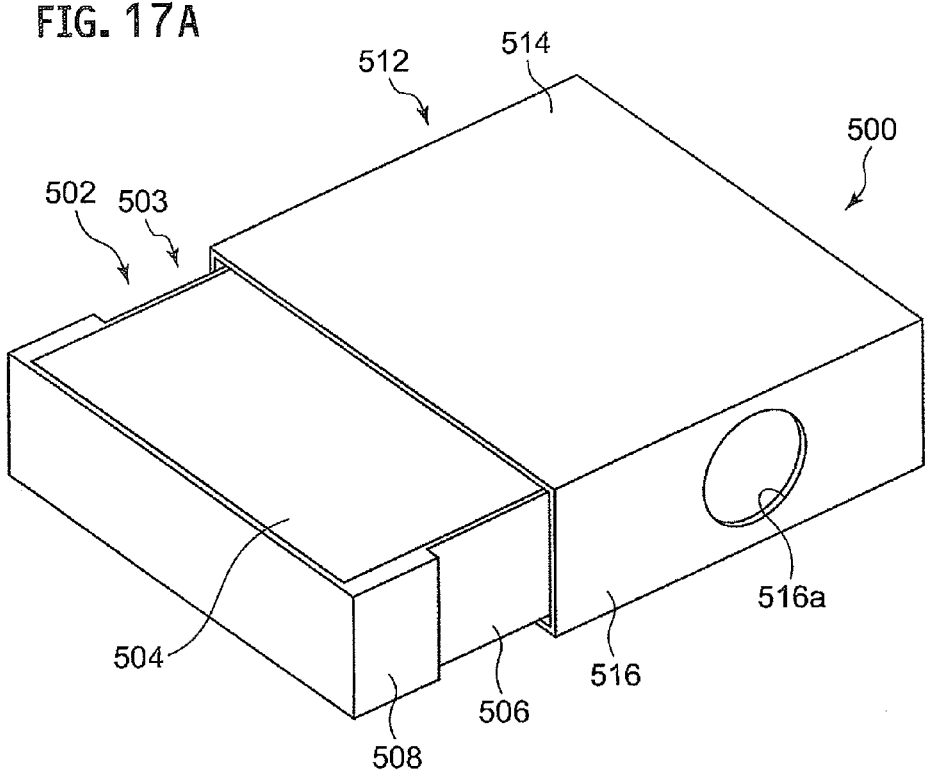
FIG. 17A is a perspective view of the projector according to the eighth embodiment when the cover is in a storage position.
Figure 17B:
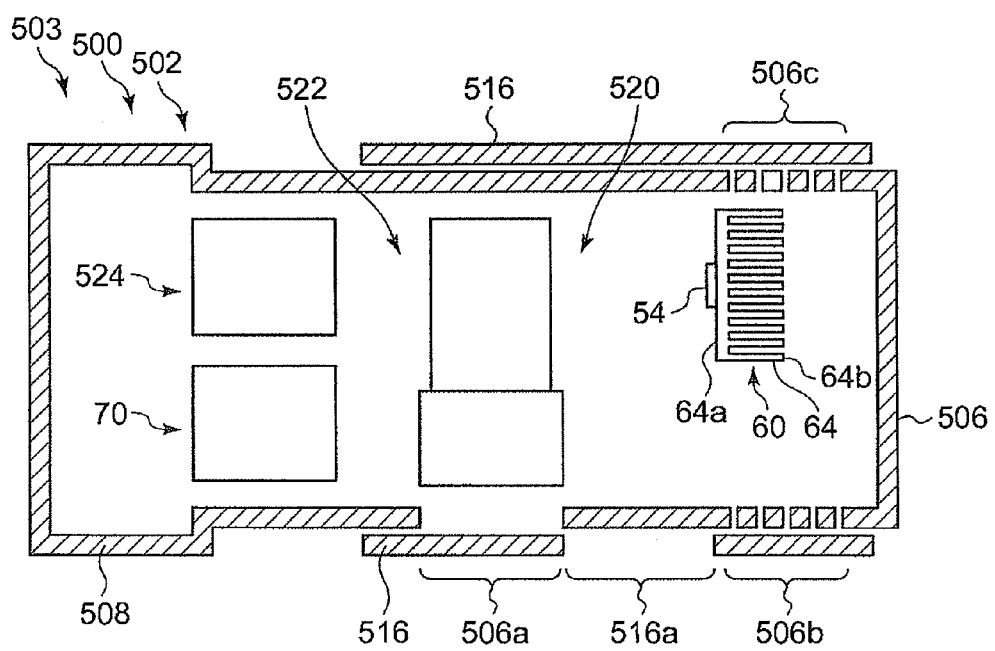
FIG. 17B is a top transparent view of the projector according to the eighth embodiment when the cover is in the storage position.

FIGS. 17A and 17B show the projector 500 when the cover 512 is in the storage position. At this time, the cover opening 516a is in a position in which the cover opening 516a does not overlap the opening 506a and the opening 506a is covered by the cover 512. The intake hole 506b and the exhaust hole 506c are also covered by the cover 512. Therefore, the cover 512 functions as a cover member.

(Ninth Embodiment)

Figure 18:
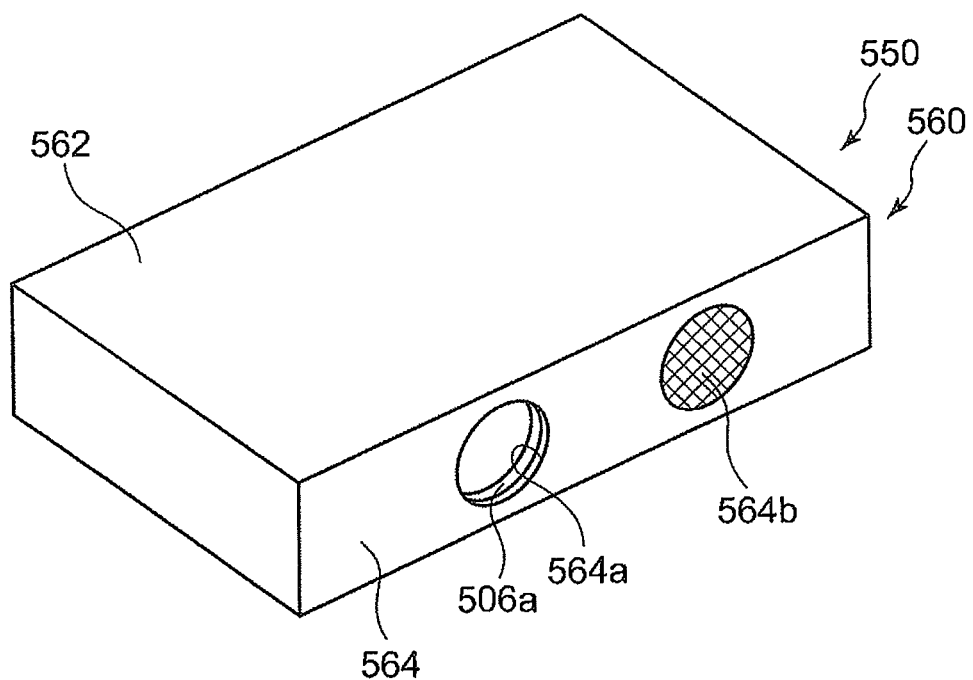
FIG. 18 is a perspective view of a projector according to a ninth embodiment.

FIG. 18 is a perspective view of a projector 550 according to a ninth embodiment. The projection unit 550 has a housing 560 having a substantially rectangular solid shape. A projection unit 552, a drive mechanism 524, and an electronic control unit 70 are provided inside the housing 560.

Figure 19:
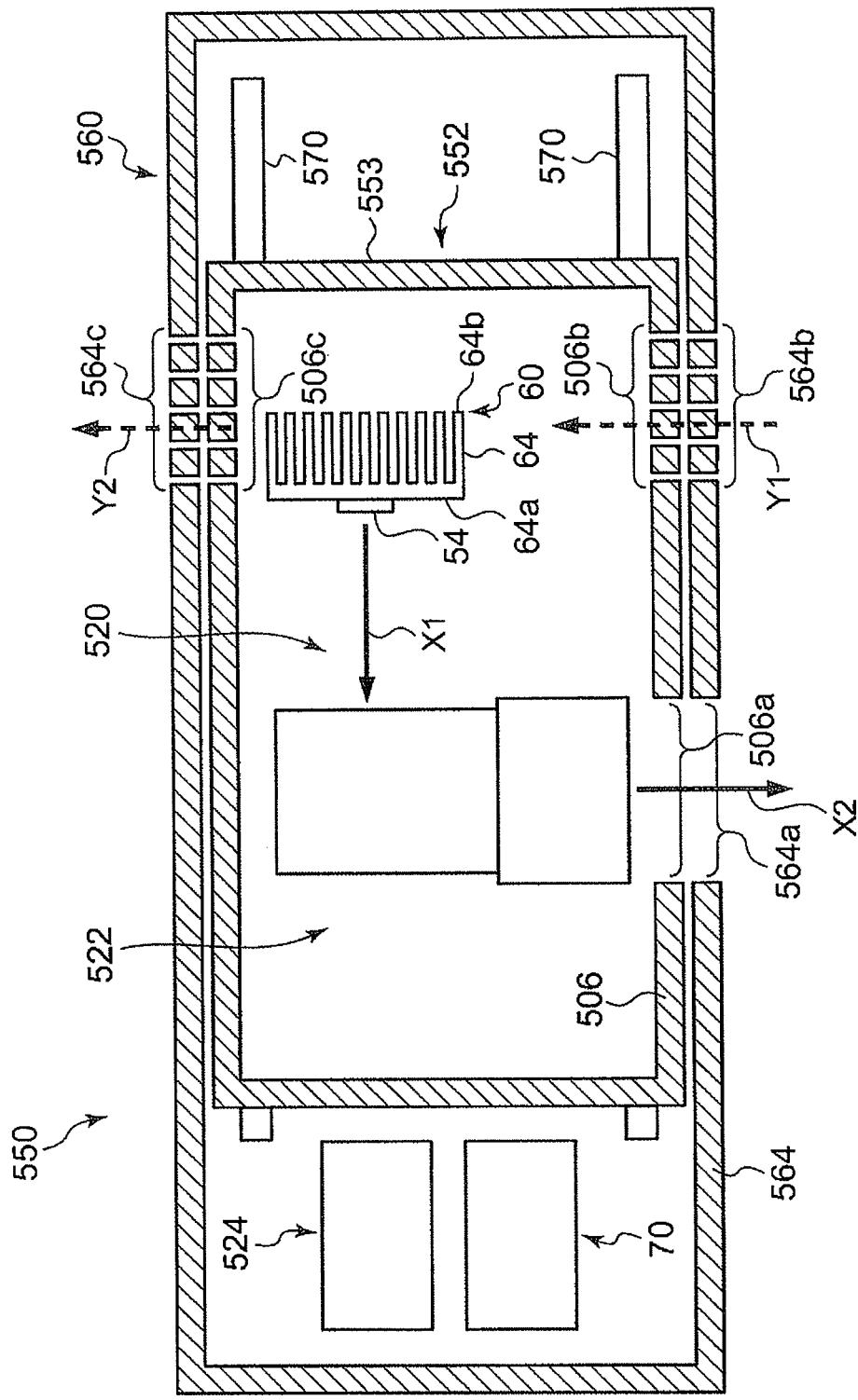
FIG. 19 is a top transparent view of the projector according to the ninth embodiment when a projection unit is in a projection position.
Figure 20:
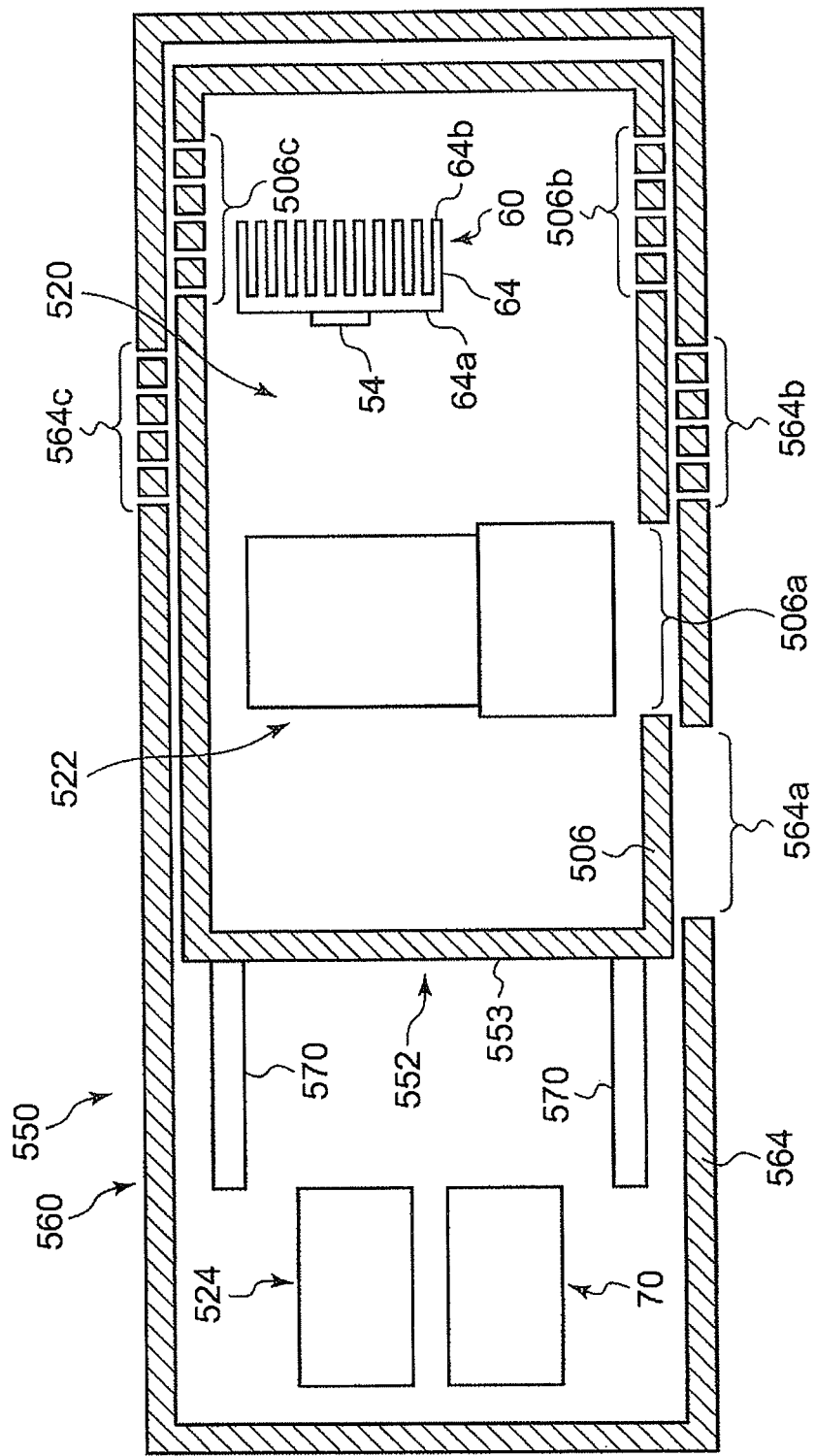
FIG. 20 is a top transparent view of the projector according to the ninth embodiment when the projection unit is in a storage position.

FIGS. 19 and 20 are top transparent views of the projector 550 according to the ninth embodiment. The projector 550 is configured in the same manner as the projector 500 of the eighth embodiment except that the projection unit 552 is provided instead of the projection unit 502 and the housing 560 is provided instead of the cover 512. The projection unit 552 is configured in the same manner as the projection unit 502 except that a chassis 553 is provided instead of the chassis 503 and the drive mechanism 524 and the electronic control unit 70 that are provided inside the projection unit 502 are not provided. The drive mechanism 524 and the electronic control unit 70 are provided inside the housing 560. The chassis 553 is configured in the same manner as the chassis 503 according to the eighth embodiment except that the protrusion portions 508 of the chassis 503 are not provided.

The housing 560 has two housing bottom portions 562 corresponding to an upper surface and a lower surface and four housing side portions 564 including a front surface and a rear surface. The chassis 553, the drive mechanism 524, and the electronic control unit 70 are provided inside the housing 560. A housing opening 564a is provided in the front surface of the housing side portions 564. When the housing opening 564a overlaps the opening 506a, an image is projected to the outside through the housing opening 564a. A housing intake hole 564b is provided in the front surface of the housing side portions 564.

When the housing intake hole 564b overlaps the intake hole 506b, air Y1 is taken in from the outside. A housing exhaust hole 564c is provided in the rear surface of the housing side portions 564. When the housing exhaust hole 564c overlaps the exhaust hole 506c, the air that is taken in is exhausted out as air Y2.

The drive mechanism 524 includes guide rails 570 instead of the guide rail 530. The guide rails 570 are attached to the inside of the housing 560 and slidably support the projection unit 552 so that the projection unit 552 can slide in the horizontal direction. The power transmission mechanism 528 provides a drive force in the horizontal direction to the chassis 553 through the motor 526.

When receiving a projection preparation request, the electronic control unit 70 controls the drive mechanism 524 to slide the projection unit 552 to the projection position. Specifically, the electronic control unit 70 causes the projection unit 552 to slide leftward until the projection unit 552 comes to a position in which the housing opening 564*a* and the opening 506*a* overlap each other. When receiving a projection prevention request, the electronic control unit 70 controls the drive mechanism 524 to slide the projection unit 552 to the storage position. Specifically, the electronic control unit 70 causes the chassis 553 to slide rightward until the chassis 553 comes to a position in which the housing opening 564*a* and the opening 506*a* do not overlap each other and the opening 506*a* is covered by the housing 560.

FIG. 19 shows the projector 550 when the projection unit 552 is in the projection position. At this time, the housing opening 564*a* is in a position in which the housing opening 564*a* overlaps the opening 506*a* and the projection mechanism 520 can project an image to the outside through the opening 506*a* and the housing opening 564*a*. The intake hole 506*b* and the exhaust hole 506*c* are in a position in which the intake hole 506*b* and the exhaust hole 506*c* overlap the housing intake hole 564*b* and the housing exhaust hole 564*c* respectively, so that the intake hole 506*b* and the exhaust hole 506*c* are not covered by the housing 560.

FIG. 20 shows the projector 550 when the projection unit 552 is in the storage position. At this time, the housing opening 564*a* is in a position in which the housing opening 564*a* does not overlap the opening 506*a* and the opening 506*a* is covered by the housing 560. The intake hole 506*b* and the exhaust hole 506*c* are in a position in which the intake hole 506*b* and the exhaust hole 506*c* do not overlap the housing intake hole 564*b* and the housing exhaust hole 564*c* respectively, so that the intake hole 506*b* and the exhaust hole 506*c* are covered by the housing 560.

The present invention is not limited the embodiments described above and an embodiment in which components of the embodiments are appropriately combined is effective as an embodiment of the present invention. It is possible to add modifications such as various design modifications to each embodiment on the basis of the knowledge of those skilled in the art, and an embodiment to which such modifications are added may be included in the scope of the present invention.

For example, in the first to the seventh embodiments, the rotation angle for the projection unit to switch between the projection position and the storage position is not limited to the angles described in each embodiment, but any rotation angle may be used if the objects described in each embodiment can be achieved by the rotation angle.

Although, in the descriptions of the above embodiments, either one of the projection unit and the cover member is moved by the drive mechanism, it may be configured so that the drive mechanism moves both the projection unit and the cover member to achieve the same object. In this case, the cover member is configured to be able to move separately from the housing.

What is claimed is:
1. A projector comprising:
a projection unit including a projection mechanism that projects an image, an opening from which image projection light from the projection mechanism is output, and air holes that take in and exhaust air used to dissipate heat of the projection mechanism;
a cover member including no air hole that takes in or exhausts air used to dissipate heat of the projection mechanism, and configured to rotatably support the projection unit to rotate the projection unit among a storage position in which an image is not projected and a plurality of projection positions each in which an image is projected, cover the air holes and the opening when the projection unit is in the storage position, and uncover the air holes and the opening when the projection unit is in each of the projection positions;
a drive mechanism configured to rotate the projection unit or the cover member; and
a control unit configured to control the drive mechanism rotate the projection unit to one of the projection positions when the control unit receives a predetermined projection preparation request and rotate the projection unit to the storage position when the control unit receives a predetermined storage request,
wherein the projection unit is rotated so as not to change positions of all of the air holes with respect to a light source.
2. The projector according to claim 1, wherein
the air holes include an intake hole from which air used to dissipate heat of the projection mechanism is taken in and an exhaust hole from which the air is exhausted, and
the cover member covers the intake hole and the exhaust hole when the projection unit is in the storage position, and uncovers the intake hole and the exhaust hole when the projection unit is in each of the projection positions.
3. The projector according to claim 2, wherein the intake hole uses the opening.
4. The projector according to claim 1, further comprising a heat dissipation member used to dissipate heat the light source included in the projection mechanism, wherein
the heat dissipation member is provided to be in contact with both the light source and air taken in and to be exhausted from the air holes, and
the heat dissipation member separates an inside area of the projection unit provided with the projection mechanism from an air passing area through which the air passes in order to prevent the air from entering the inside area.

* * * * *

UNITED STATES PATENT AND TRADEMARK OFFICE
CERTIFICATE OF CORRECTION

PATENT NO. : 9,028,076 B2  
APPLICATION NO. : 13/538063  
DATED : May 12, 2015  
INVENTOR(S) : Ryo Nishima et al.

Page 1 of 1

It is certified that error appears in the above-identified patent and that said Letters Patent is hereby corrected as shown below:

In the Claims,

Claim 4, Column 18, Line 47: Insert --of-- between "heat" and "the".

Signed and Sealed this
First Day of September, 2015

Michelle K. Lee
*Director of the United States Patent and Trademark Office*